United States Patent [19]

Kamiya et al.

[11] Patent Number: 5,572,361
[45] Date of Patent: Nov. 5, 1996

[54] BINOCULAR SYSTEM WITH AUTOMATIC DIOPTER POWER ADJUSTMENT

[75] Inventors: Makoto Kamiya, Osaka; Katsuhito Akagi; Yukio Maekawa, both of Sakai; Kazuo Kimura; Yoshiharu Ohta, both of Sakai; Haruyuki Nagano, Sakai; Ichiro Yoshiyama, Kobe; Masataka Hamada, Osakasayama; Kohtaro Hayashi, Suita; Keiji Yamazaki, Sakai, all of Japan

[73] Assignee: Minolta Camera Kabushiki Kaisha, Osaka, Japan

[21] Appl. No.: 962,286

[22] Filed: Oct. 16, 1992

[30] Foreign Application Priority Data

Oct. 17, 1991 [JP] Japan .................................. 3-297898
Oct. 31, 1991 [JP] Japan .................................. 3-313354
Oct. 31, 1991 [JP] Japan .................................. 3-313355

[51] Int. Cl.$^6$ .................................................. G02B 23/00
[52] U.S. Cl. .......................... 359/426; 359/407; 359/410
[58] Field of Search .................................. 359/375, 379, 359/383, 399, 404, 407, 410, 425, 426; 351/205, 206, 211, 246

[56] References Cited

U.S. PATENT DOCUMENTS

| | | | |
|---|---|---|---|
| 4,013,340 | 5/1977 | Mukai | 359/417 |
| 4,284,325 | 8/1981 | Ishibai | 359/417 |
| 4,293,187 | 10/1981 | Ishibai | 359/418 |
| 4,488,037 | 12/1984 | Ishibai | 250/204 |
| 4,516,840 | 8/1985 | Nakahashi | 359/376 |
| 4,650,297 | 3/1987 | Ishibai | 359/418 |
| 4,744,648 | 5/1988 | Kab et al. | 351/211 |
| 5,311,354 | 5/1994 | Kamiya et al. | 359/407 |

FOREIGN PATENT DOCUMENTS

| | | |
|---|---|---|
| 50-99750 | 8/1975 | Japan . |
| 50-153952 | 12/1975 | Japan . |
| 55-143511 | 11/1980 | Japan . |
| 57-196206 | 12/1982 | Japan . |
| 58-21222 | 2/1983 | Japan . |
| 59802 | 1/1984 | Japan . |
| 60-46407 | 10/1985 | Japan . |
| 63-161424 | 7/1988 | Japan . |
| 63-206731 | 8/1988 | Japan . |
| 420915 | 1/1992 | Japan . |

*Primary Examiner*—Thong Nguyen
*Attorney, Agent, or Firm*—Price, Gess & Ubell

[57] ABSTRACT

In a telescope, the adjustment order is limited so that dioptric power adjustment is made after adjustment of a distance between a pair of optical systems is completed. A pupil distance and a dioptric power correction amount are stored in a memory for every user. When a user uses the telescope, his or her pupil distance and dioptric power correction amount are read out from the memory to automatically make adjustment.

8 Claims, 32 Drawing Sheets

Excitation Sequence
(Two-phase Excitation)

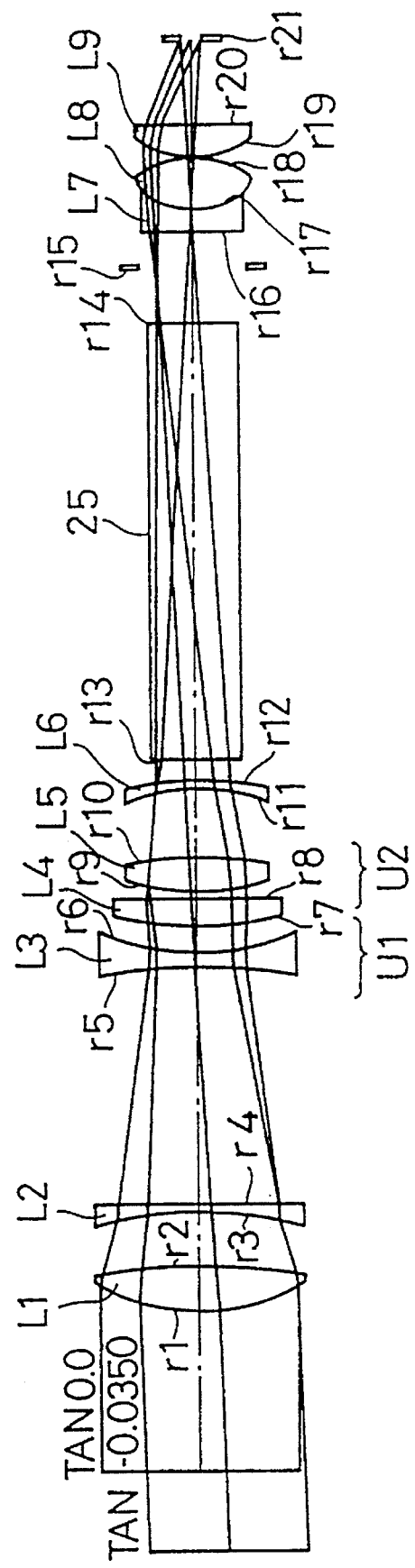

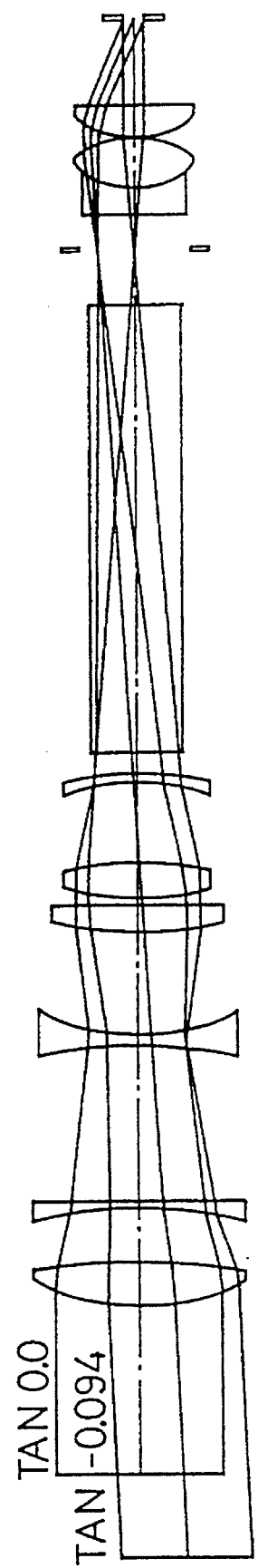
Fig. 34 (Middle)

(Wide)

BINOCULAR SYSTEM WITH AUTOMATIC DIOPTER POWER ADJUSTMENT

BACKGROUND OF THE INVENTION

1. Field of the Invention

The present invention relates to a binocular, and more particularly, to a binocular where pupil distance adjustment and dioptric power adjustment can be automatically set for a specific user.

2. Description of the Prior Art

In a binocular, it is desirable that a pupil distance adjustment and a dioptric power adjustment based on a difference in dioptric power among users are possible, since a pupil distance and a dioptric power differ from user to user.

Japanese laid-open Patent Application S50-153952 discloses a technology to manually adjust a pupil distance and a dioptric power. Japanese laid-open Patent Application S63-161424 discloses a pupil distance adjusting apparatus where the distance between objective lenses are fixed and the distance between eyepieces are manually changed.

In a binocular, generally, pupil distance adjustment is made only by hand. Concerning dioptric power adjustment, however, Japanese laid-open Patent Application S63-206731 discloses a method of automatically making it.

A binocular is frequently used by a plurality of persons (for example, by family member such as father, children, etc.). In view of such a situation, a binocular has been proposed where each user remembers a value or a position of a graduation corresponding to his or her pupil distance, and in using the binocular, the user turns a dial to the value or the position of the graduation, and then, the movement of a lens barrel stops and the pupil distance is set. Moreover, Japanese laid-open Patent Application S50-99750 discloses a binocular where the dioptric power positions of a plurality of users are mechanically stored.

However, since the pupil distance is manually adjusted and the dioptric power is mechanically stored according to these methods, respectively, the adjustments cannot easily and quickly be made. Further, the remembered value or position of a pupil distance and the stored dioptric power positions cannot be utilized for another binocular.

Since the dioptric power adjustment is difficult, it is desirable that it be automatically made. Moreover, concerning the pupil distance adjustment, it is convenient if the pupil distance is automatically adjusted to the pupil distance of a user.

However, if pupil distance adjustment and dioptric power adjustment can be made at random without an order of the adjustments, the adjustments are not quickly made and the eyes are burdened.

In pupil distance adjustment, the left and right optical systems move in directions opposite to each other (that is, to the left and right) in order to increase and decrease the pupil distance. If a TTL (through the lens) method is used where light having passed through the objective lens is used for focus detection for causing a dioptric power so that an in-focus image is viewed by a user (this operation will hereinafter be referred to as AF [automatic focusing] to distinguish it from the above-mentioned dioptric power adjustment based on a user's dioptric power), the length of an optical path to a focus detecting sensor varies when the optical systems move to the left and right. As a result, detection accuracy varies.

SUMMARY OF THE INVENTION

An object of the present invention is to provide a binocular where the order of the pupil distance adjustment and the dioptric power adjustment is limited to a desirable order.

Another object of the present invention is to provide a binocular where a dioptric power in accordance with a user can easily and quickly be realized.

Still another object of the present invention is to provide a binocular where in spite that the TTL method is used, the accuracy in focus detection does not vary even though the pupil distance adjustment is made.

With one feature of the present invention, a binocular of the present invention is provided with: a pair of optical systems; distance adjusting means for changing a distance between the pair of optical systems; dioptric power adjusting means for changing a dioptric power of each of the pair of optical systems; and controlling means for causing the dioptric power adjusting means to operate after an operation of the distance adjusting means is completed.

With such a feature, since pupil distance adjustment (or setting) is made first and dioptric power adjustment (setting) is made after pupil distance adjustment is completed, dioptric power is adjusted under a condition where the left and right images coincide with each other. As a result, the eyes of a user viewing through the telescope are not burdened during the adjustments (or settings).

According to another feature of the present invention, a binocular is provided with: an optical system; storing means for storing a data corresponding to a user's dioptric power; and dioptric power adjusting means for adjusting a dioptric power of the optical system according to a data stored in the storing means.

With such a feature, the dioptric power of a user is stored in the storing means in the form of data, and the dioptric power data is read out from the storing means to adjust the dioptric power based on the data. As a result, the dioptric power can automatically and quickly be set. Further, if the storing means is an IC (integrated circuit) card, the dioptric power can be set in a similar manner with respect to another binocular having the same function by attaching the IC card to the binocular.

With respect to still another feature of the present invention, a binocular is provided with: a pair of optical systems; detecting means for performing detection for focusing by use of light incident on one of the pair of optical systems; and adjusting means for adjusting a distance between the pair of optical systems by moving one of the optical systems.

With such a feature, since the pupil distance adjustment is made by moving only an optical system from which no light for focus detection is extracted, an optical system from which light for focus detection is extracted is always fixed with respect to the left and right directions, and consequently, the length of an optical path to a position from which light is extracted and to the focus detecting sensor is constant. As a result, focus detection accuracy does not vary due to the pupil distance adjustment.

BRIEF DESCRIPTION OF THE DRAWINGS

These and other objects and features of this invention will become clear from the following description, taken in conjunction with the preferred embodiments with reference to the accompanied drawings in which:

FIG. 32 shows an arrangement, at a tele limit, of lens systems constituting left and right optical systems;

FIG. 34 shows an arrangement, at a middle position, of the lens systems constituting the left and right optical systems;

DESCRIPTION OF THE PREFERRED EMBODIMENTS

The present invention will hereinafter be described with reference to the drawings.

Figure 1:
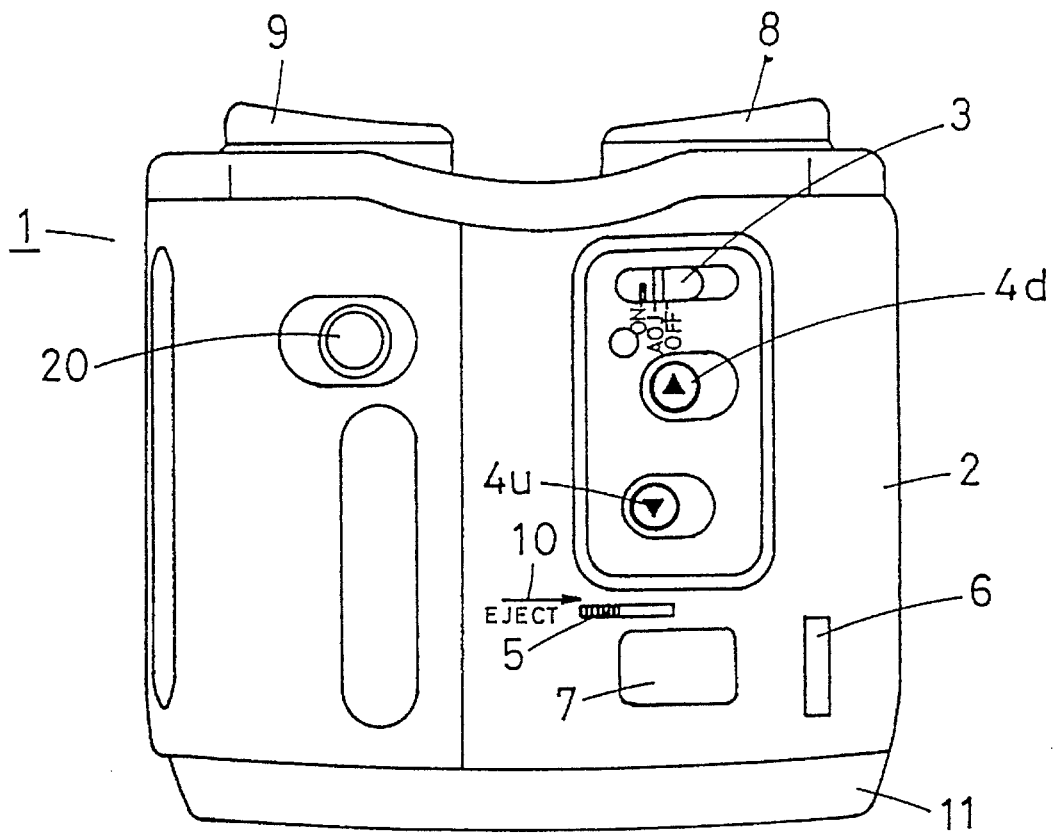
FIG. 1 is a plan view of a binocular embodying the present invention.
Figure 2:
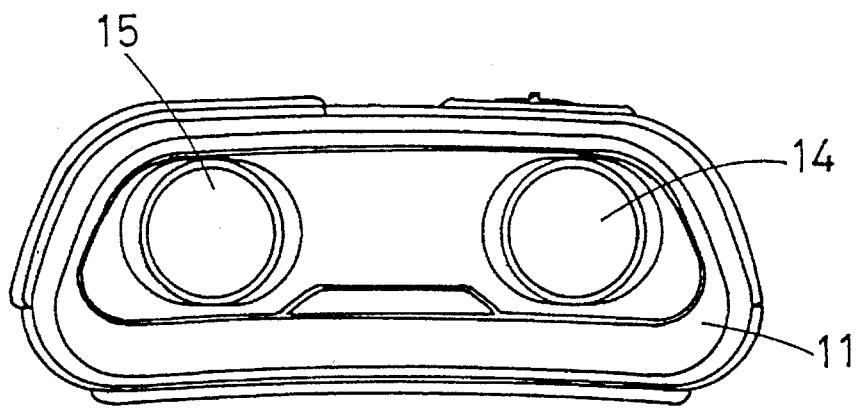
FIG. 2 is a front view of the binocular of FIG. 1.
Figure 3:
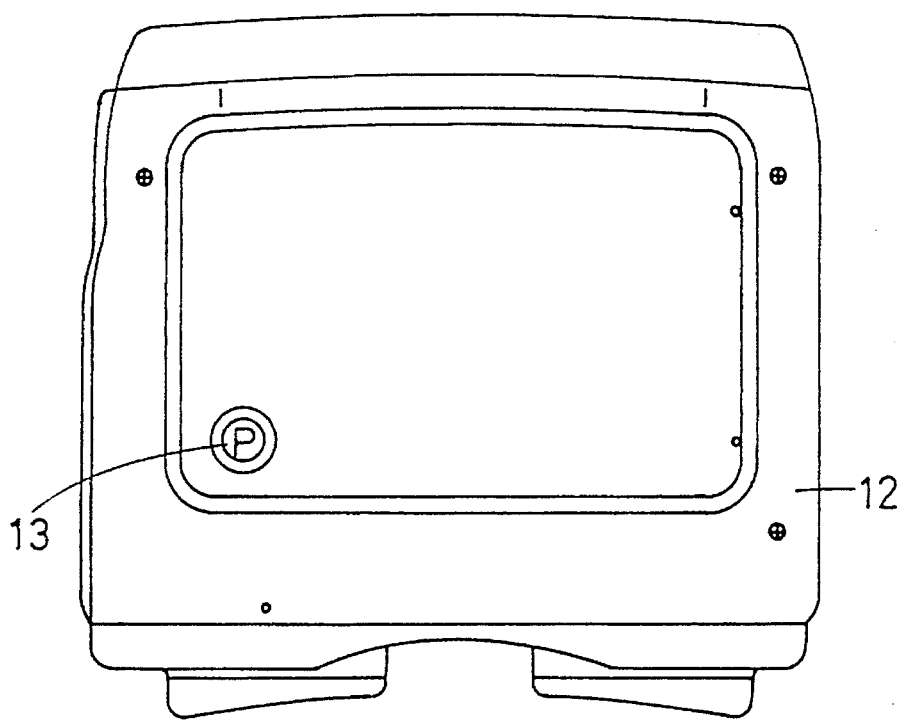
FIG. 3 is a bottom view of the binocular of FIG. 1.
Figure 4:
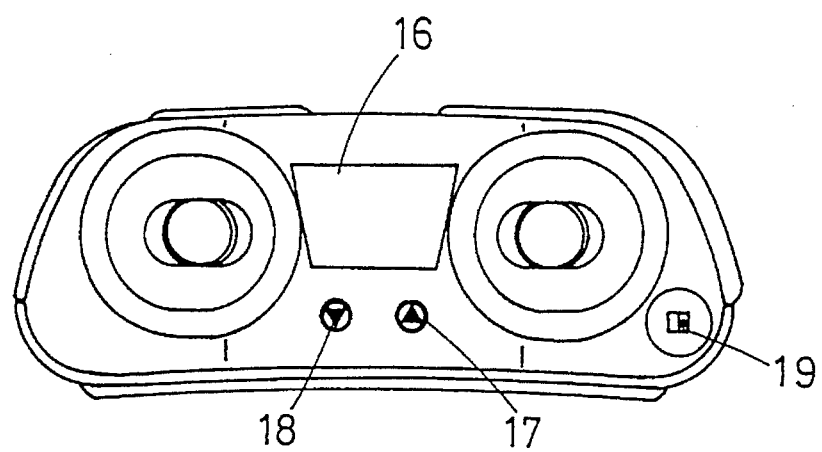
FIG. 4 is a rear view of the binocular of FIG. 1.
Figure 5:
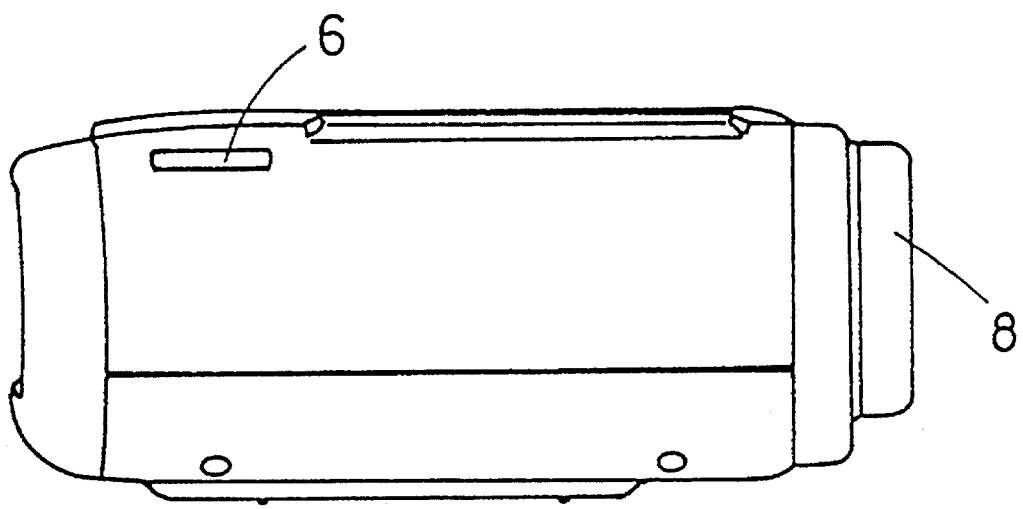
FIG. 5 is a right side view of the binocular of FIG. 1.

FIGS. 1 to 5 show the appearance of a binocular 1. FIG. 1 is a plan view. FIG. 2 is a front view. FIG. 3 is a bottom view. FIG. 4 is a rear view. FIG. 5 is a right side view.

The following are provided on an upper cover 2 of the binocular 1: an operation member 3 for operating a main switch; an operation button 4u which operates a wide/up switch for moving a zoom lens in a wide (short focal length) direction in a zooming mode and adjusting the pupil distance and the dioptric power in an up (increasing) direction in a pupil distance and dioptric power adjusting mode; an operation button 4d which operates a tele/down switch for driving the zoom lens in a tele (long focal length) direction in the zooming mode and adjusting the pupil distance and the dioptric power in a down (decreasing) direction in the pupil distance and dioptric power adjusting mode; an operation button 20 which operates an AF/setting switch that is turned on to start AF (automatic focusing) and is used for setting an adjustment value in the pupil distance and dioptric power adjusting mode; and an ejecting operation member 5 for ejecting an IC card.

An IC card can be attached to the binocular 1 to add a specific function to the binocular 1. An IC card inserting/ejecting slot 6 and a transparent window 7 for observing an inserted IC card are also provided on the upper cover 2.

The operation member 3 is a three-position member. In addition to ON and OFF positions required to cause a main switch to work, an adjustment position (ADJ position) for setting a subsequently-described adjusting mode is provided to the operation member 3 between the ON and OFF positions. The operation buttons 4u and 4d have triangular marks which indicate the up and down directions viewed from the user's side (that is, from the rear side on which eyepiece hoods 8 and 9 are provided). The ejecting operation member 5 has a jagged portion on its surface to facilitate the transmission of operation force. The ejecting operation member 5 is slid toward the right in the figure (that is, in a direction of arrow 10) to eject an IC card from the binocular 1 through the inserting/ejecting slot 6.

Figure 13:
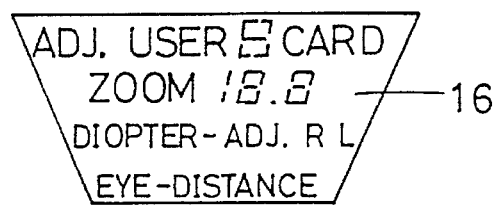
FIG. 13 shows a display example provided on an external surface of the binocular of this embodiment.

As shown in FIG. 3, a push-button-type operation button 13 for operating a subsequently-described main user switch is provided on a lower cover 12. As shown in FIG. 2, light entry windows 14 and 15 for right and left optical systems are provided on a front cover 11. As shown in FIG. 4, an inverse-trapezoid-shaped first display apparatus 16 is provided on the rear side. The first display apparatus 16 is constituted by LCD (liquid crystal display) devices. A display example thereof is shown in FIG. 13. Below the first display apparatus 16, a pair of up and down buttons 17 and 18 for operating a selecting switch are provided. The selecting switch is used for selecting a previously-registered user. Numeral 19 is a battery cover provided at the entrance of a battery cavity.

Figure 6:
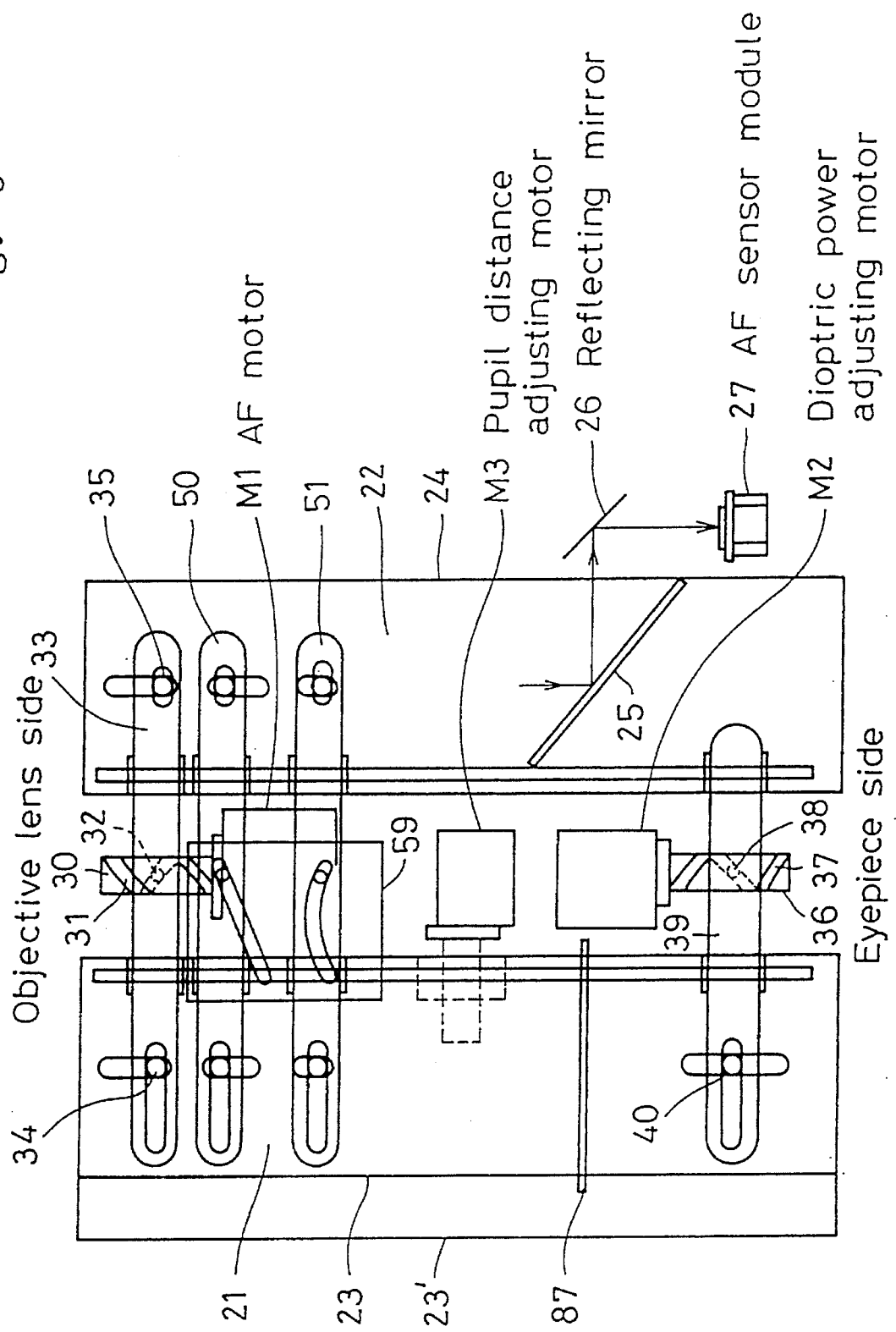
FIG. 6 is a layout view showing a schematic arrangement of the inside of the binocular of FIG. 1.
Figure 7:
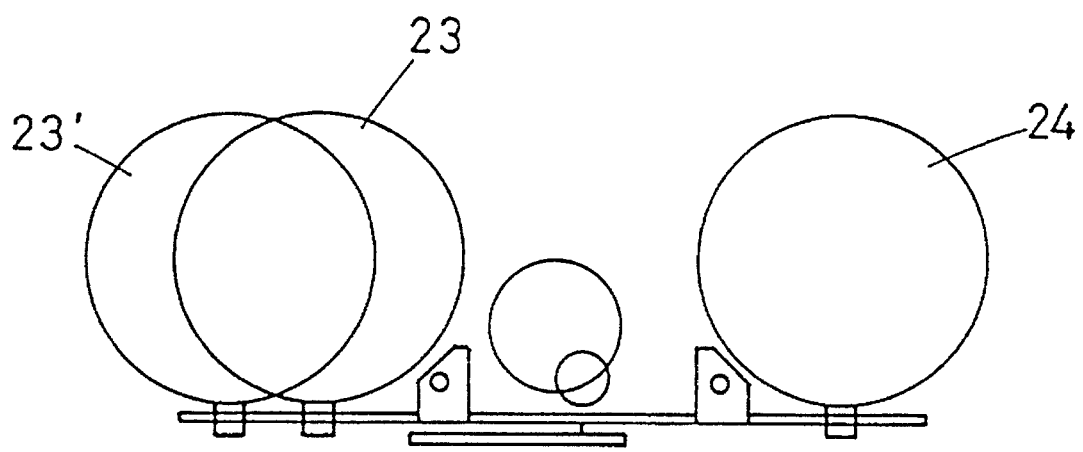
FIG. 7 is a layout view of the binocular of FIG. 1 from the rear side.

FIG. 6 is a plan layout view showing a driving mechanism of the binocular 1. FIG. 7 is a rear layout view thereof. Numeral 23 is a lens barrel for a left optical system 21. Numeral 24 is a lens barrel for a right optical system 22. An objective lens is provided in the front of each of the lens barrels 23 and 24, while an eyepiece is provided in the rear. Concerning dioptric power adjustment, in this embodiment, left side dioptric power adjustment (hereinafter referred to as L dioptric adjustment) is made by the eyepiece of the left optical system 21, while right side dioptric power adjustment (hereinafter referred to as R dioptric power adjustment) is made by the objective lens of the right optical system 22. Therefore, the eyepiece of the right optical system 22 can be fixed.

Figure 8:
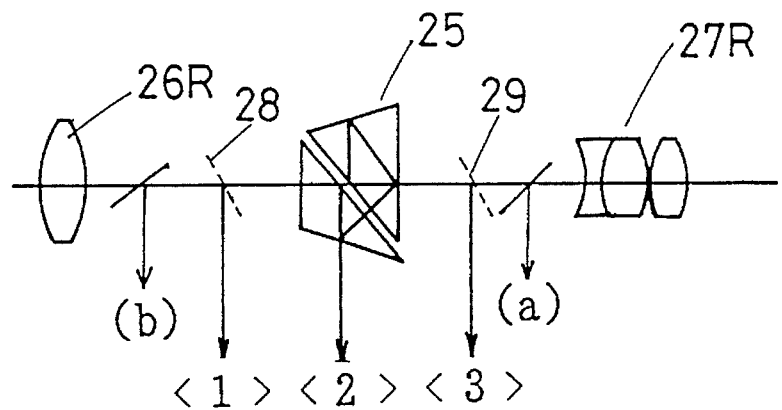
FIG. 8 shows an example of an optical path of a focus detecting TTL light beam of this embodiment.

The right optical system 22 extracts a light beam used for focus detection and distance measurement in automatic focusing. For the extraction, a light extracting member (erecting prism) 25 is provided between the objective lens and the eyepiece in the lens barrel 24. A light beam extracted by the light extracting member 25 is bent perpendicularly to the optical axis and outputted to the outside of the lens barrel 24. Then, the light beam is bent toward the rear by a reflecting mirror 26 and directed to an AF sensor module 27. FIG. 8 shows an example in which a roof prism is used as the light extracting member 25. <2> shows a position and a direction of a light beam outputted from the roof prism. Designation 26R is the objective lens of the right optical system 22. Designation 27R is the eyepiece of the right optical system 22. Numerals 28 and 29 show limits of the reflecting surface positions of the roof prism on the optical .axis. The reflecting surface of the roof prism is placed somewhere between the limits 28 and 29. <1> and <3> show positions and directions of an AF light beam extracted at the limits 28 and 29, respectively. Moreover, light for focus detection may be extracted at a position in front of or behind the light extracting member 25 as shown at (a) and (b) in the figure.

Figure 9:
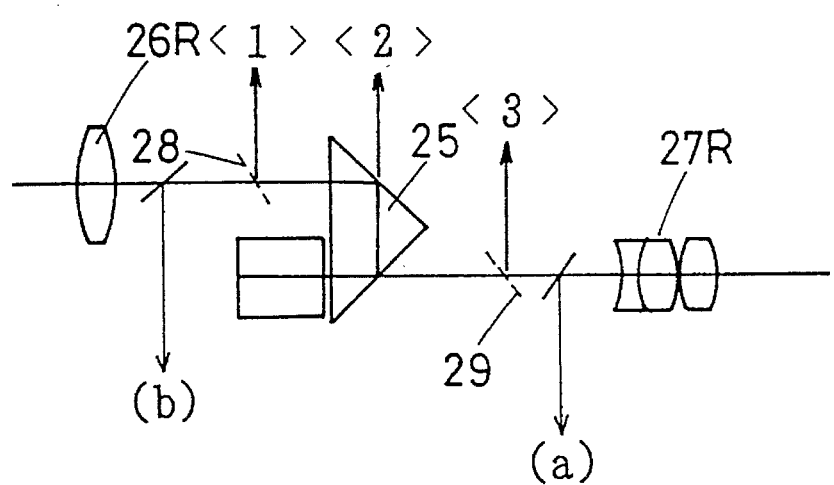
FIG. 9 is a view showing another example of an optical path of a focus detection TTL light beam of this embodiment.

While an objective lens and an eyepiece are provided to each of the lens barrels 23 and 24 as described above in this embodiment, an objective lens and an eyepiece may be provided in different lens barrels, respectively. FIG. 9 shows a manner of extracting an AF light beam in such a case. A triangular prism whose light extracting surface is a half mirror is used as the light extracting member 25. Moreover, light for focus detection may be extracted at a position in front of or behind the light extracting member 25 as shown at (a) and (b) in the figure.

Returning to FIG. 6, M1 is an AF/dioptric power adjusting motor (hereinafter referred to as AF motor). Its drive force is transmitted to an AF lever 33 through a cam shaft 30 and a pin 32 which slidably engages with a groove 31 provided on the cam shaft 30. The force is further transmitted from the AF lever 33 to AF lens units of the right and left optical systems 21 and 22 through pins 34 and 35 fixed to the AF lens units of the objective lenses. In the transmission path, the rotation of the AF motor M1 is converted to a rectilinear motion by the cam shaft 30 and the pin 32 to move the AF lens units of the objective lenses along the optical axes. Between the AF motor M1 and the cam shaft 30, a deceleration mechanism is provided.

Figure 10:
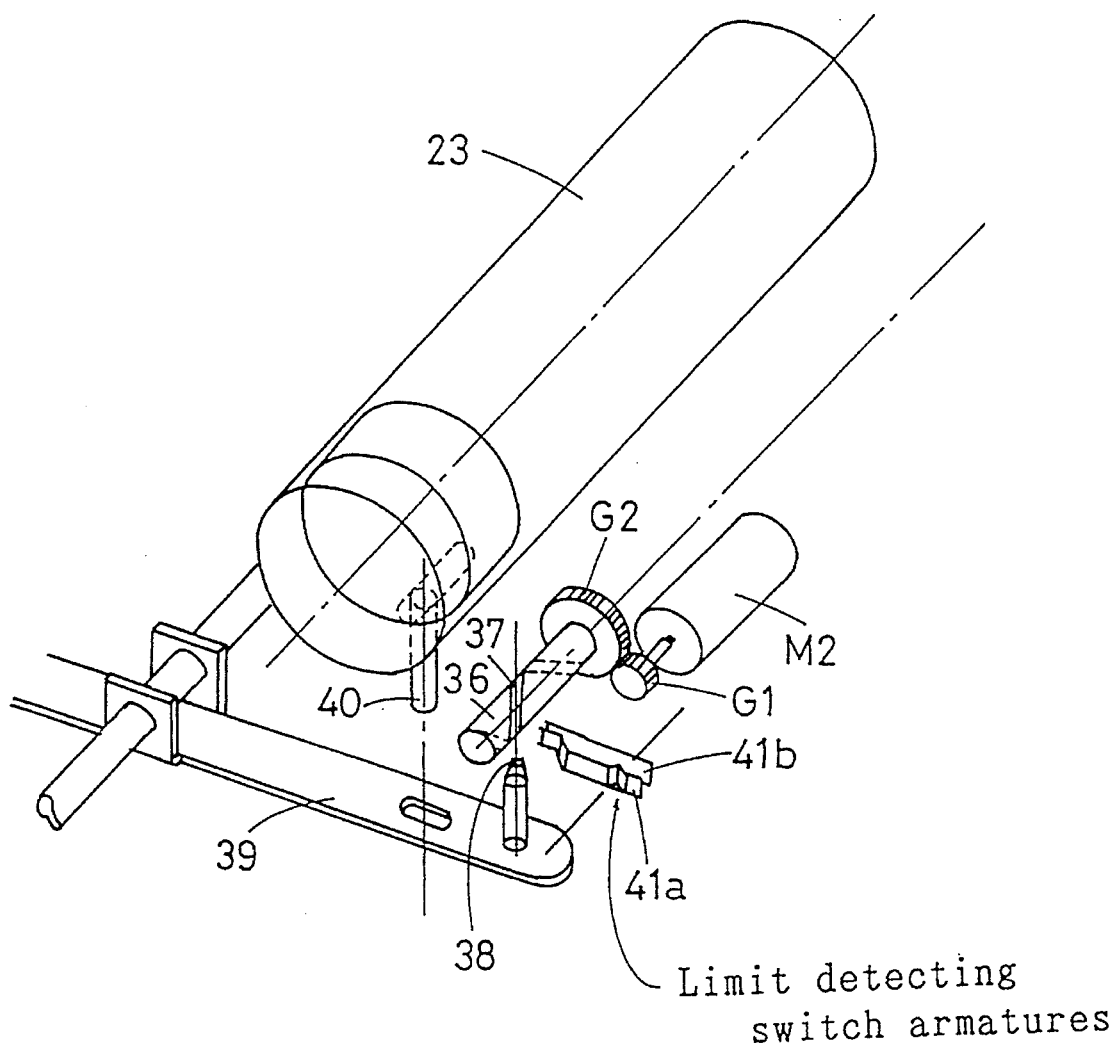
FIG. 10 shows a dioptric power adjusting mechanism of this embodiment.

A drive force transmitting mechanism of an L dioptric power adjusting motor M2 is constructed substantially in a manner similar to that of the above-described drive force transmitting mechanism of the AF motor M1 except that the drive force of the motor M2 is only transmitted to the eyepiece of the left optical system 21. Numerals 36 and 37 are a cam shaft and a cam groove of the motor M2, respectively. Numeral 38 is a pin of a lever 39. Numeral 40 is a pin fixed to the eyepiece of the left optical system 21. FIG. 10 is an exploded perspective view of the transmitting mechanism. G1 and G2 are deceleration gears. Designations 41a and 41b are contact blades of a limit detecting switch.

Figure 11:
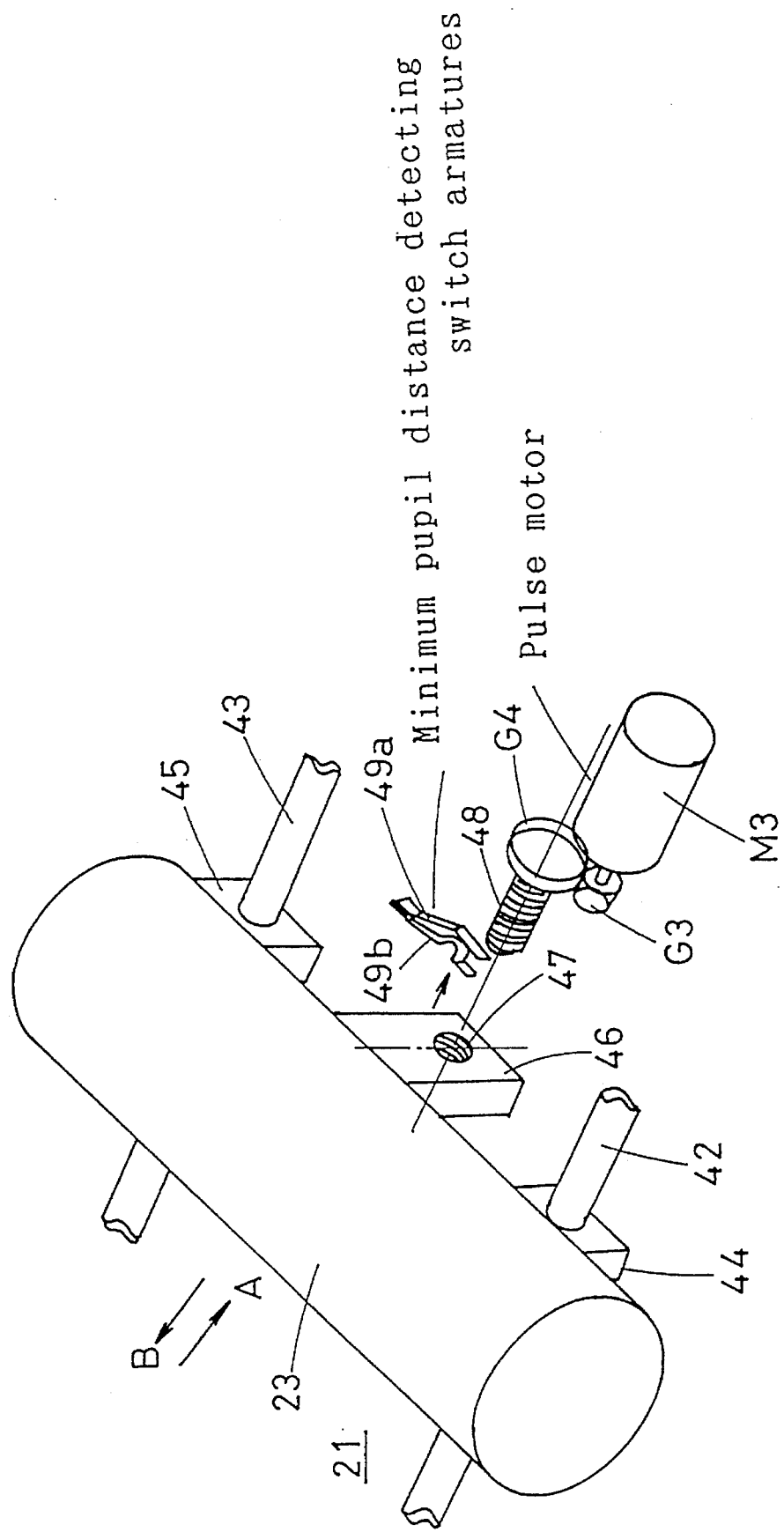
FIG. 11 shows a pupil distance adjusting mechanism of this embodiment.

Returning to FIG. 6, M3 is a pupil distance adjusting motor. A pupil distance adjusting mechanism using drive force of the motor M3 will be described with reference to FIG. 11. The lens barrel 23 of the left optical system 21 is slidably supported by a pair of supporting rods 42 and 43 fixed to the frame of the binocular 1. Protrusions 44 and 45 of the lens barrel 23 slidably engage with the supporting rods 42 and 43 through holes provided in protrusions 44 and 45, respectively. The lens barrel 23 is provided with a protrusion 46 having a thread groove 47. A screw 48 rotated by the motor M3 is screwed down in the thread groove 47 of the protrusion 46. The screw 48 is designed to be rotatable, and the position thereof is fixed. When the screw 48 is rotated by the motor M3, the lens barrel 23 which engages with the screw 48 through the protrusion 46 moves along the supporting rods 42 and 43 in a direction of arrow A or B. The pupil distance is varied by the movement of the lens barrel 23. Designations 49a and 49b are contact blades of a switch for detecting a minimum pupil distance position. The detecting switch is turned on when the protrusion 46 is brought into contact with the contact blades 49a and 49b. G3 and G4 are deceleration gears. In this embodiment, the lens barrel 23 of the left optical system 21 is movable for dioptric power adjustment, while the lens barrel 24 of the right optical system 22 in which a TTL (through the lens) distance measurement light beam is extracted is stationary. In FIGS. 6 and 7, numeral 23' shows a condition where the lens barrel 23 is moved toward the left to increase the pupil distance.

Figure 12:
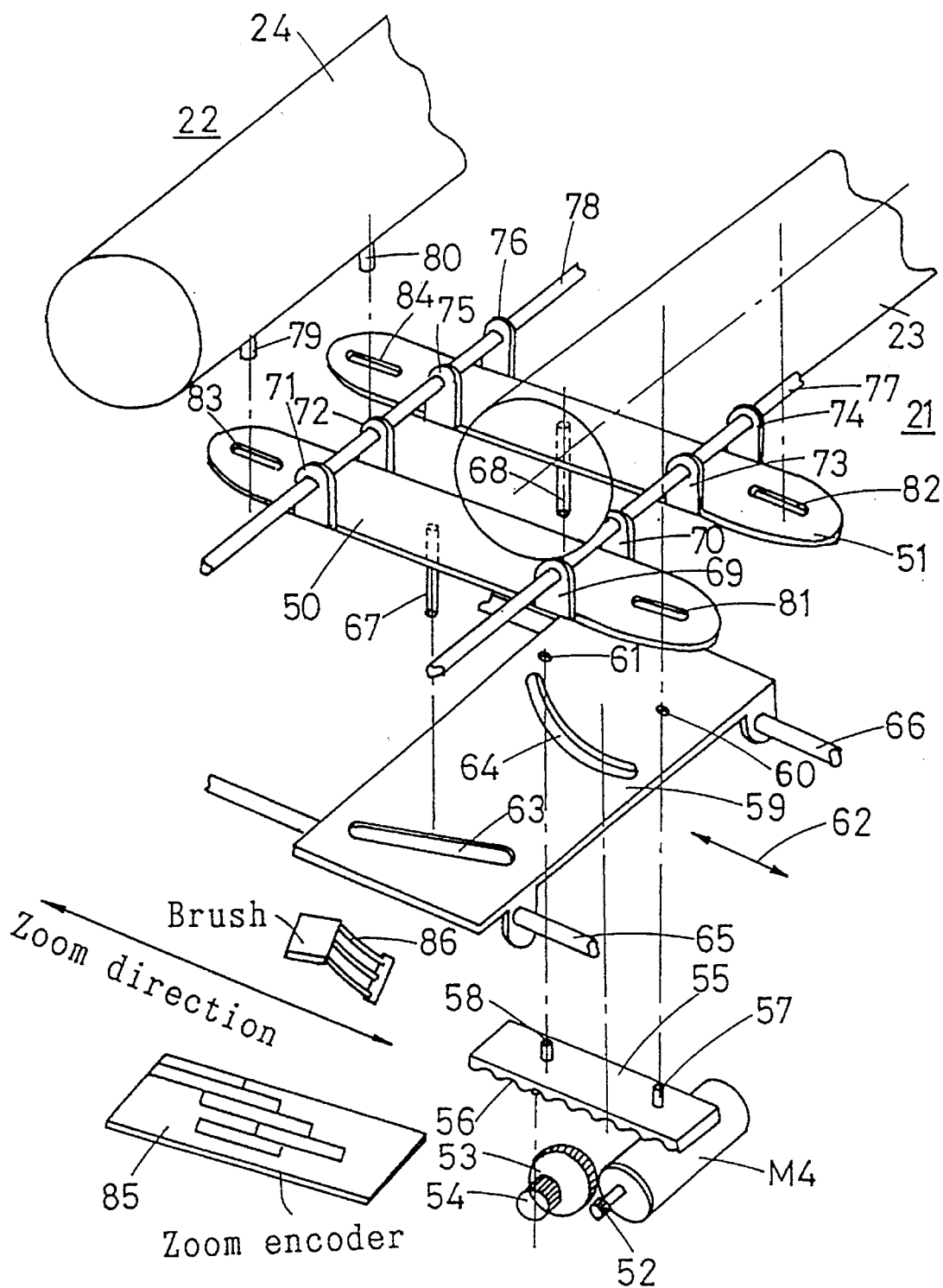
FIG. 12 shows a zoom mechanism of this embodiment.

In FIG. 6, numerals 50 and 51 are zoom levers. A zoom mechanism including the levers 50 and 51 as intermediate transmitting members will be described with reference to FIG. 12.

M4 is a zoom motor. Its drive output is transmitted to a rack 55 through gears 52, 53 and 54. The rack 55 has a rack gear 56 and a pair of pins 57 and 58 protruding upward. The pins 57 and 58 engage with holes 60 and 61 provided in a moving plate 59 to move the moving plate 59 in a direction perpendicular to the optical axes of the optical systems (that is, in directions of arrow 62). Numerals 65 and 66 are supporting rods which slidably support the moving plate 59. The moving plate 59 has a comparatively long, curved slots 63 and 64. Pins 67 and 68 provided to the levers 50 and 51, respectively, are inserted and moved in the slots 63 and 64.

The levers 50 and 51 are movably supported through protrusions 69 to 72 and protrusions 73 to 76, respectively, by supporting rods 77 and 78. By the movement of the levers 50 and 51, zoom lens units of the objective lenses provided in the lens barrels 23 and 24 are moved. The zoom lens unit will be described with respect to the right optical system 22. The zoom lens unit includes two lens units U1 and U2 (see FIG. 32) which have pins 79 and 80, respectively, protruding from the lens barrel 24. The pins 79 and 80 engage with holes 83 and 84 of the levers 50 and 51, respectively. By the engagement, the lens units U1 and U2 are moved along the optical axis accompanying the movement of the levers 50 and 51. The zoom lens unit of the left optical system 21 has a similar structure. Numerals 81 and 82 are holes with which two pins (not shown) provided to the zoom lens unit of the left optical system 21 engage.

Numeral 85 is a zoom encoder. Numeral 86 is a brush unit which moves while being in contact with the zoom encoder 85. The brush unit 86 is attached to the moving plate 59. An output of the zoom encoder 85 is used for drive control of the motor M4 which is an DC (direct current) motor.

As described above, four motors M1 to M4 are used in this embodiment. The AF motor M1, the L dioptric power adjusting motor M2 and the pupil distance adjusting motor M3 are stepping motors, while the zoom motor M4 is a DC motor.

Figure 14:
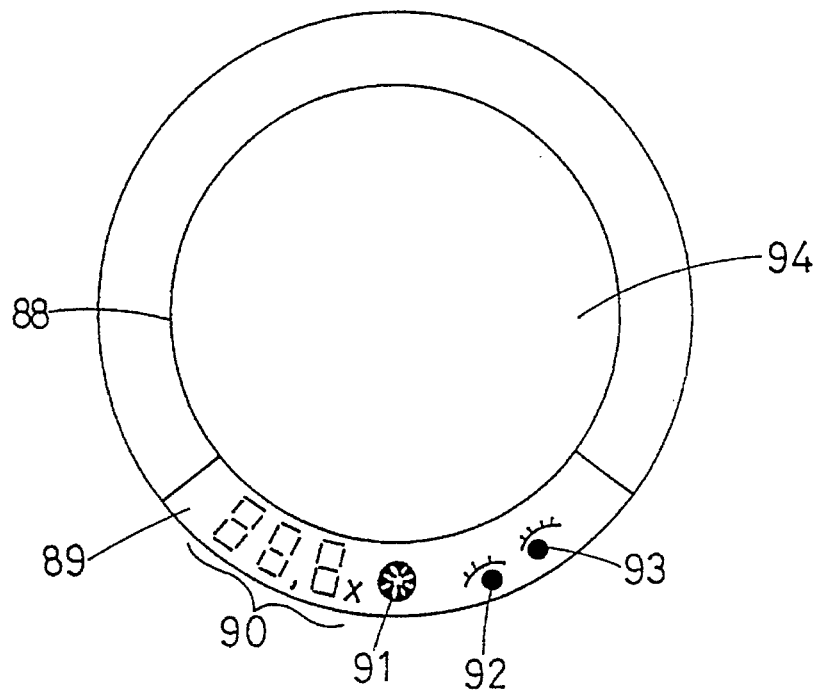
FIG. 14 shows an internal display portion of the binocular of this embodiment.
Figure 15:
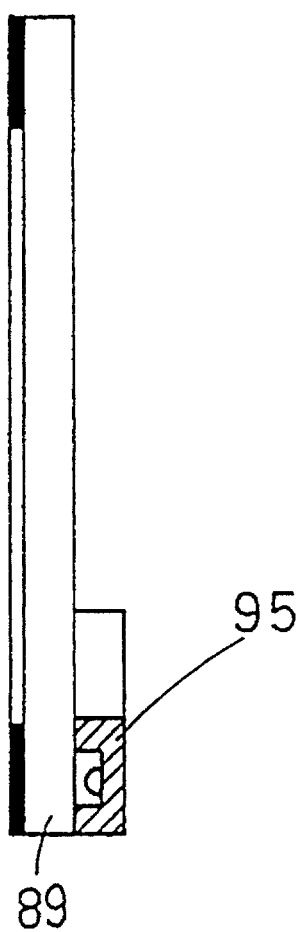
FIG. 15 is a cross-sectional view of the internal display portion.

Returning to FIG. 6, a second display apparatus 87 for internal display is provided in the lens barrel 23 of the left optical system 21. The second display apparatus 87 is constituted by LCD devices as shown in FIGS. 14 and 15. In FIG. 14, numeral 88 is a field frame. A magnification display portion 90, in-focus state display mark 91 and right and left eye marks 92 and 93 are arranged on a portion 89 outside the field frame 88. The in-focus state display mark 91 is ON under in-focus state, (that is, a state in which an object is observed under in-focus condition), blinks under low contrast state (that is, when the contrast of an object situated within an AF area is lower than a predetermined value), and is OFF under out-of-focus state. Both of the eye marks 92 and 93 blink during the pupil distance adjustment. Only the left eye mark 92 blinks during the L dioptric power adjustment. Only the right eye mark 93 blinks during the R dioptric power adjustment. As shown in FIG. 15, the portion 89 is provided with a light emitting diode (LED) 95 for backlighting. A portion 94 inside the field frame 88 (that is, image plane), which is also constituted by LCD devices, is of light transmitting type. Light having entered the left optical system 21 decreases in amount when passing through the LCD devices. However, since light having entered the right optical system 22 also decreases in amount because of the TTL focus detection, the light amounts of the left and right optical systems 21 and 22 are well-balanced. A similar effect will be obtained with an optical filter other than the LCD.

Figure 16:
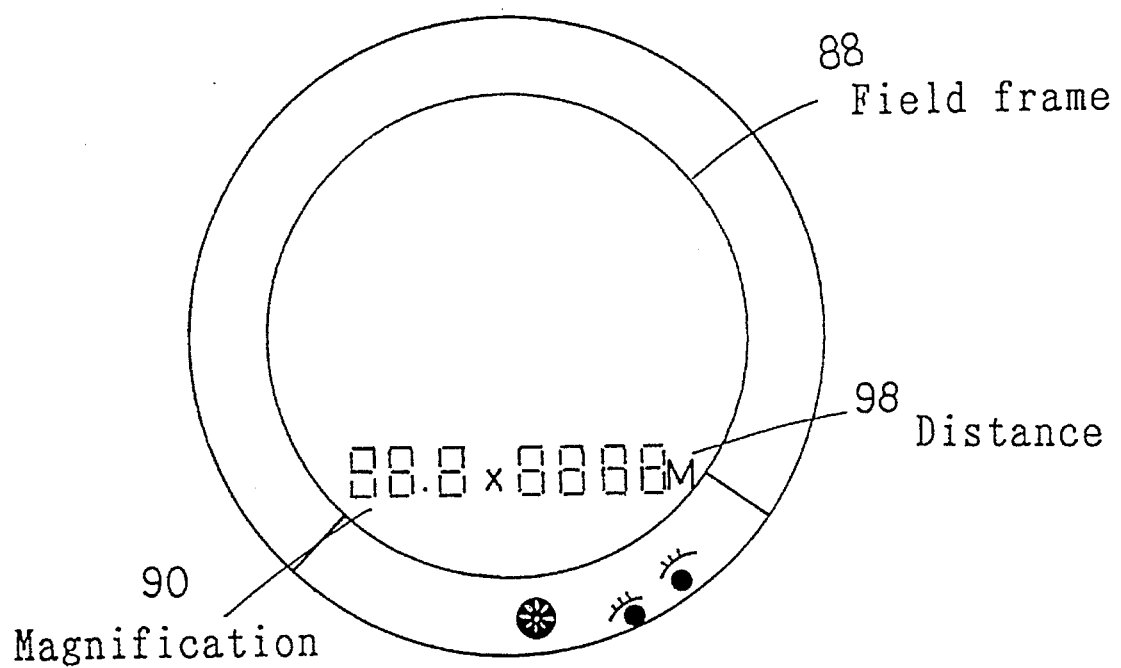
FIG. 16 shows another example of an internal display portion of the binocular of this embodiment.
Figure 17:
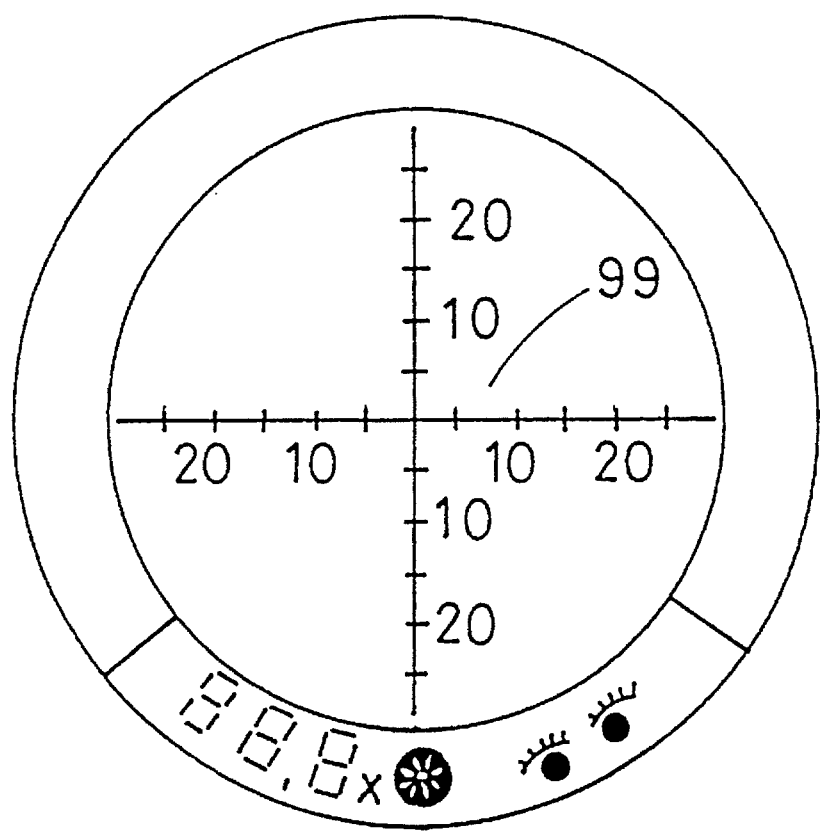
FIG. 17 shows still another example of an internal display portion of the binocular of this embodiment.

The magnification display portion 90 may be provided on the image plane inside the field frame 88 as shown in FIG. 16 to provide a display by a superimposing method. In FIG. 16, a display 98 of a distance to an object is also provided by the superimposing method. Moreover, as shown in FIG. 17, a scale 99 may be displayed within the image plane by the superimposing method in accordance with the magnification to measure the size of an object.

Figure 18:
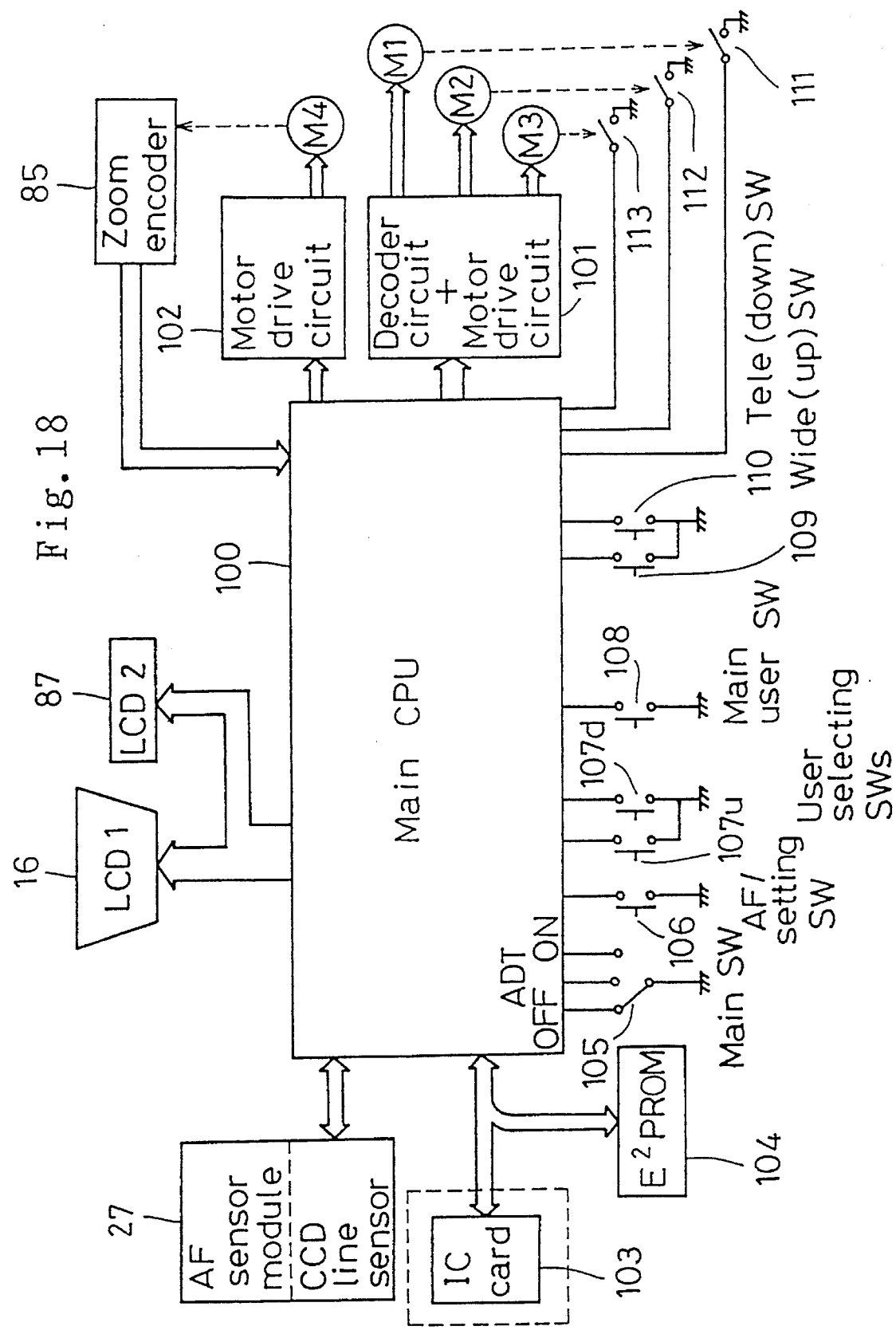
FIG. 18 is a block diagram showing an arrangement of a circuit of the binocular of this embodiment.

FIG. 18 shows a circuit arrangement of this embodiment. In addition to the above-described first and second display apparatuses 16 and 87, the following are connected to a main CPU (central processing unit) 100: the zoom encoder 85; a drive circuit 101 for the motors M1 to M3; a drive circuit 102 for the motor M4; a CCD (charge coupled device) line sensor of the AF sensor module 27; an IC card 103; an E²PROM (electrically erasable programmable read only memory) 104; and various switches. The E²PROM 104 stores various data required for control. In the data, a pupil distance data and a dioptric power data which are obtained in accordance with the user's pupil distance and dioptric power are included.

As the switches, a main switch 105, an AF/setting switch 106, user selecting switches 107u and 107d, a main user switch 108, a wide/up switch 109 and a tele/down switch 110 are connected to the CPU 100. In addition, limit detecting switches 111, 112 and 113 are connected for providing reference positions relating to the motors M1, M2 and M3. The main switch 105 is a three-position switch having an ON, an OFF and an ADJ positions. The AF/setting switch 106 functions as an AF switch in an AF mode and functions as a setting switch in a pupil distance and dioptric power adjusting mode (ADJ mode). The user select switch 107u functions as an up switch for incrementing a subsequently-described user number every time it is turned on. The user select switch 107d functions as a down switch for decrementing the user number every time it is turned on. The wide/up switch 109 functions as a wide switch for moving the zoom lens in the wide direction in the zooming mode and functions as an up switch in the adjusting mode. Similarly, the tele/down switch 110 functions as a tele switch for moving the zoom lens in the tele direction in the zooming mode and functions as a down switch in the adjusting mode.

As described above, each of the AF/setting switch 106 and switches 109 and 110 are provided with two switch functions in this embodiment. The switches will hereinafter be denoted by names in accordance with the functions. For example, the AF/setting switch 106 is denoted by the AF switch in the AF mode and by the setting switch in the ADJ mode, while switches 109 and 110 are denoted by the wide switch and the tele switch, respectively, in the zooming mode and by the up switch and the down switch, respectively, in the ADJ mode.

Figure 19:
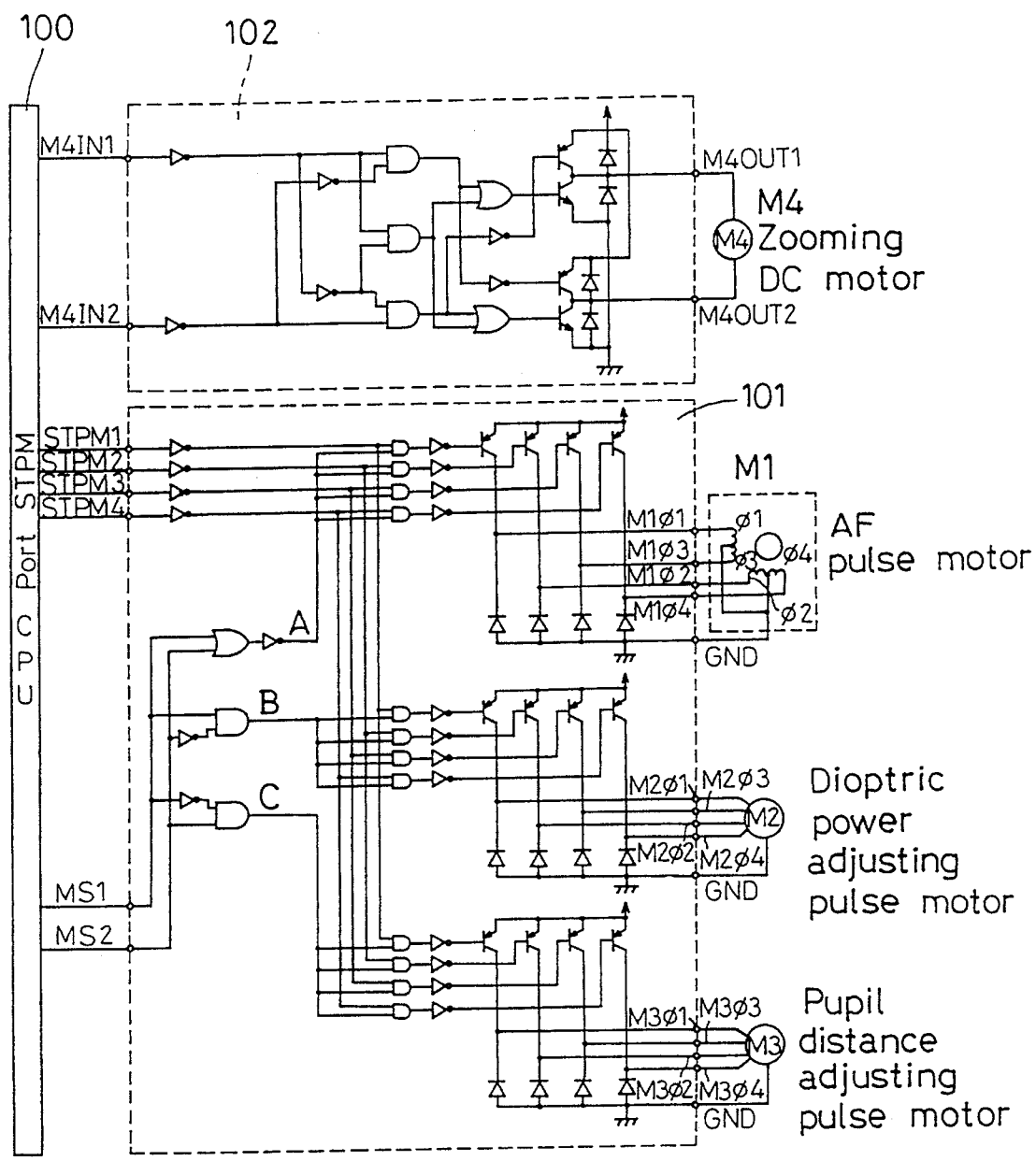
FIG. 19 is a circuit diagram showing in detail a motor driving portion of the circuit of the binocular of this embodiment.

FIG. 19 shows a detailed arrangement of the motor drive circuits 101 and 102. The motors M1, M2 and M3 are stepping motors as previously-mentioned. In FIG. 19, only the arrangement of the motor M1 is shown. The arrangements of the motors M2 and M3 are not shown since they have the same arrangements as that of the motor M1. An operation condition of the motors M1 to M3 is selected by a combination of voltage levels of output signals MS1 and MS2 of the main CPU 100 (see Table 1). Drive signals STPM1 to STPM4 are outputted from an output port STPM of the main CPU 100.

The motor M4 is driven by output signals M4IN1 and M4IN2 of the main CPU 100 (see Table 2).

Figure 20:
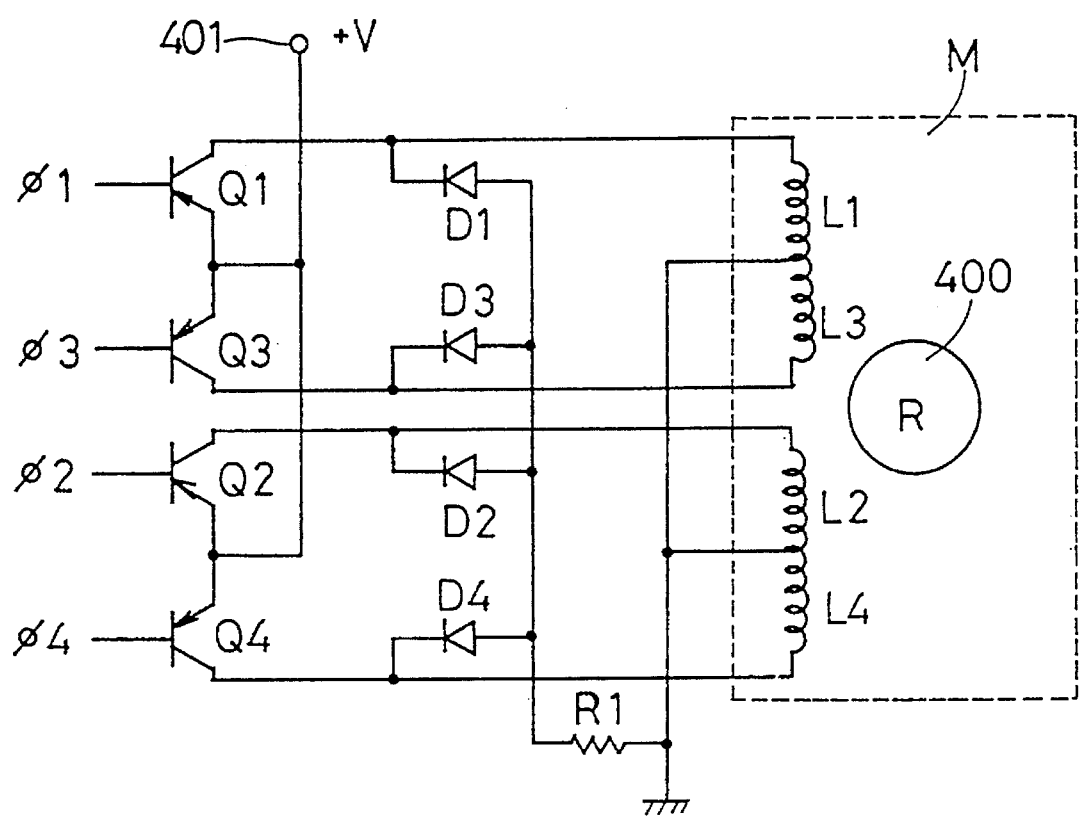
FIG. 20 shows a drive circuit of a stepping motor.

FIG. 20 shows a unipolar drive circuit used for the stepping motors M1, M2 and M3. As the drive circuit, a bipolar circuit may be used. Bipolar circuits are different from unipolar circuits in coil winding manner. If the size is the same, bipolar circuits are larger in torque but more complicated in circuit arrangement than unipolar circuits. However, since the complicated circuit arrangement is no more a problem with bipolar circuits if they are provided in the form of ICs (integrated circuits), bipolar circuits have recently been used for drive circuits. In the present embodiment, bipolar circuits may be employed.

A stepping motor M includes a rotor 400 and four exciting coils L1 to L4. A drive circuit of the motor M includes PNP transistors Q1 to Q4 whose emitters are connected to a DC power source through a terminal 401 and whose bases are connected to motor drive signal sources, diodes D1 to D4 connected to collectors of the transistors Q1 to Q4, respectively, and a resistor R1. The collectors of the transistors Q1 to Q4 are connected to one ends of the coils L1 to L4, respectively. The other ends of the coils L1 to L4 are connected to ground.

Figure 21:
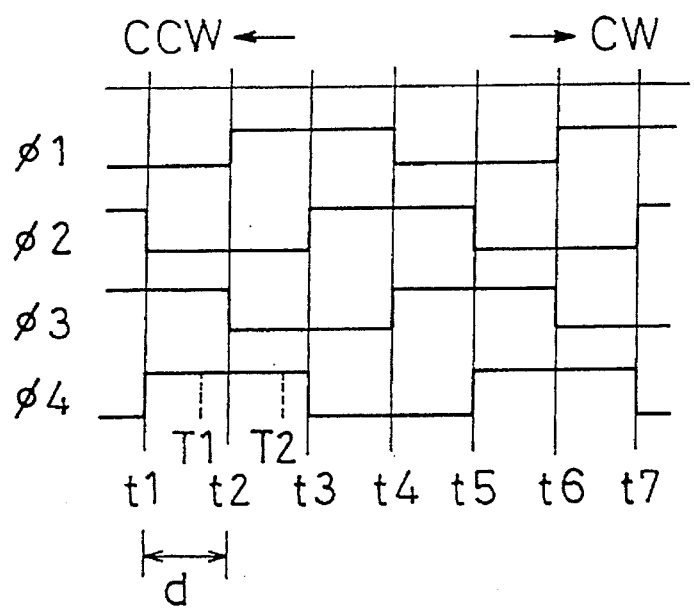
FIG. 21 is an explanatory view of a driving operation of the drive circuit of FIG. 20.

FIG. 21 shows a two-phase excitation sequence of the circuit of FIG. 20. Arrows CW and CCW show rotations of the motor M in a clockwise direction and in a counterclockwise direction, respectively. Drive signals φ1 to φ4 of low level activate corresponding transistors to send an electric current to corresponding coils. Drive signals φ1 to φ4 of high level disable the corresponding transistors to cut off the current to the corresponding coils. Longitudinal lines t1 to t7 correspond to 18° of the rotation angle of the motor M. The drive signals φ1 and φ2 are of low level between t1 and t2. Consequently, the transistors Q1 and Q2 are activated to send an electric current to the coils L1 and L2 to two-phase-excite the motor M to rotate it. In this specification, rotation of the rotor 400 is referred to as rotation of the motor M. The rotation of the motor M is started at t1, stopped at T1, and being stopped between T1 and t2. The signals φ2 and φ3 activate the transistors Q2 and Q3 between t2 and t3 to send an electric current to the coils L2 and L3 to two-phase excite the motor M. Consequently, the motor M is started again at t2, stopped at T2, and being stopped between T2 and t3. The motor M is stepping-driven in response to the sequentially occurring level down of two of the signals φ1 to φ4. Distances between t1 and t2 to between t6 and t7 are an equal distance d. The rotation of the motor M is increased by decreasing the distance d, and decreased by increasing the distance d.

Figure 22:
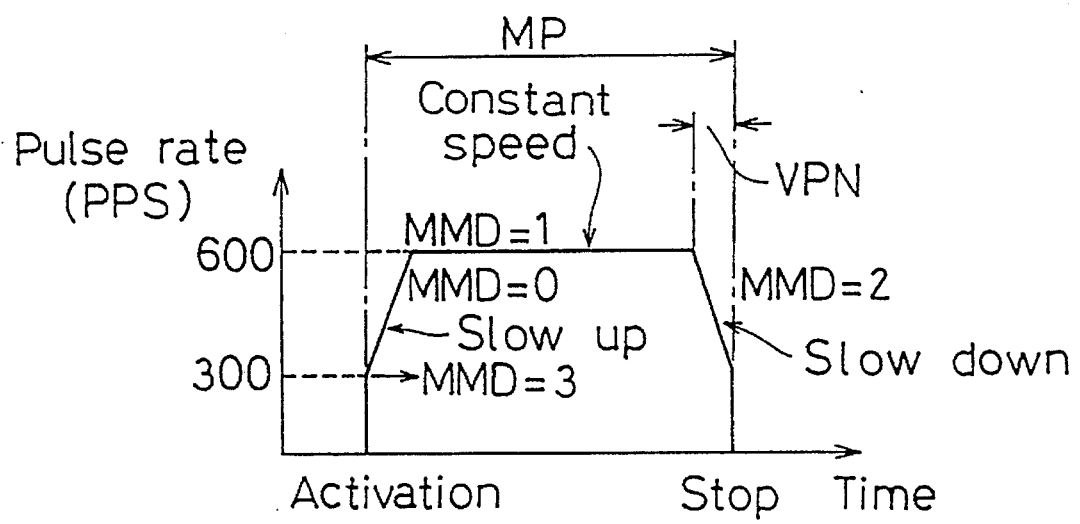
FIG. 22 is an explanatory view of a motor driving operation of the drive circuit of FIG. 20.

FIG. 22 graphically shows a motor speed control characteristic for excellently activating and stopping a stepping motor. The speed control characteristic of the motor M from activation to stopping is represented by a shape including a trapezoid shaped portion as shown in the figure. The axis of ordinates denotes the time, while the axis of abscissas denotes the speed (pulse count per second, that is, pulse rate). In order to increase torque, the speed is not instantly increased at the time of activation; the motor M is activated at a speed of 300 PPS (pulse per second). Then, the speed is gradually increased up to 600 PPS. Thereafter, the motor M is rotated at a constant speed of 600 PPS. In stopping the motor M, the speed is gradually reduced from 600 PPS to 300 PPS, and then, the motor is stopped. The period for which the speed is gradually increased will be referred to as acceleration period, while the period for which the speed is gradually reduced will be referred to as reduction period. In subsequently-described motor control of this embodiment, the motor is driven at a constant speed from the activation with no acceleration period, for example, when a lens movement amount is small.

The excitation method used for this embodiment is not limited to the above-described two-phase excitation method. A one-phase excitation method or a one-phase and two-phase excitation method (a combination of the one-phase method and the two-phase method) may be used.

Operation of this embodiment will hereinafter be described with reference to flow charts of control operations by the main CPU 100.

Figure 23:
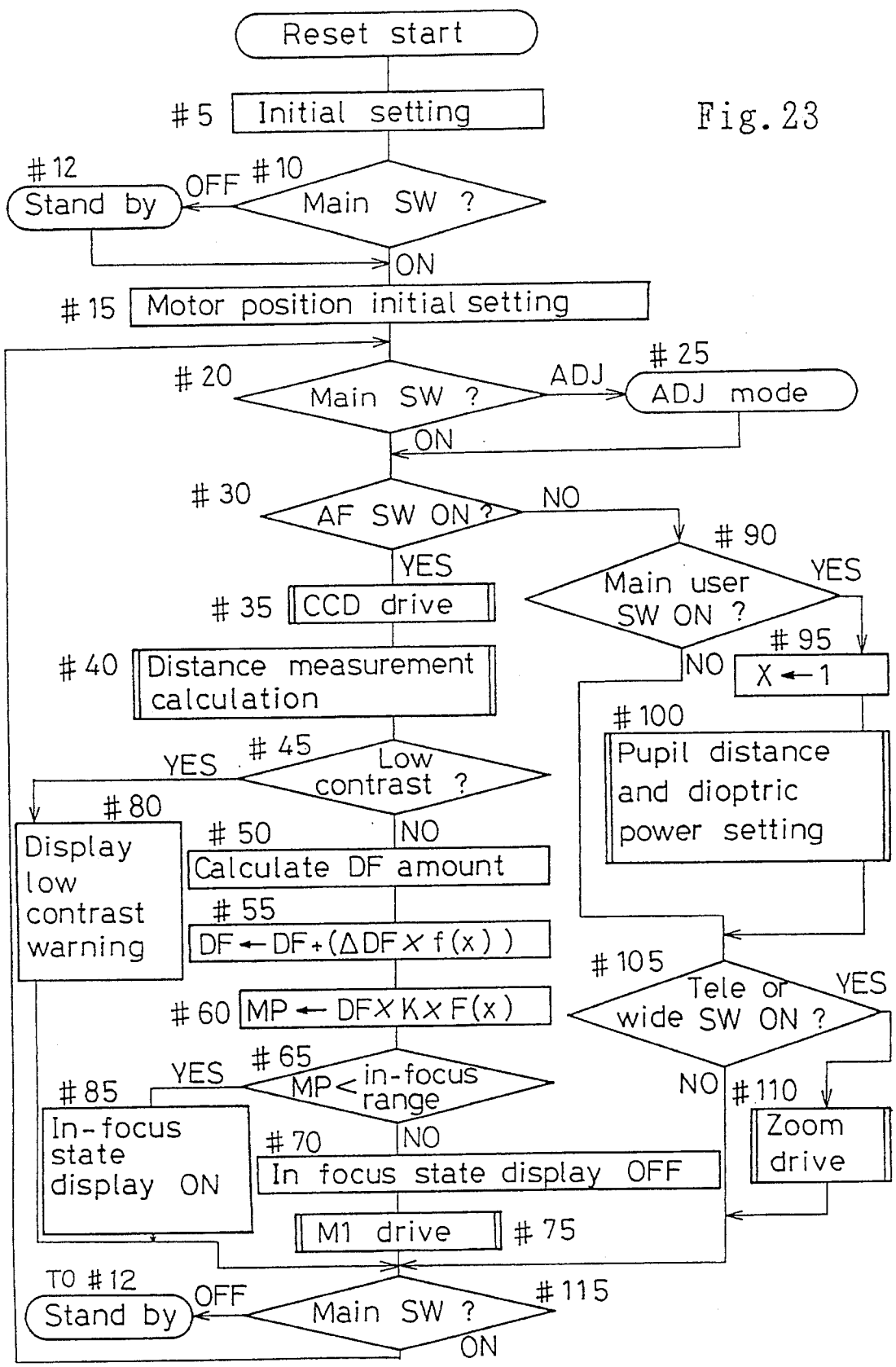
FIG. 23 is a flow chart of a main routine of a CPU of this embodiment.

FIG. 23 is a flow chart of a main routine which starts when the binocular 1 is reset. First, initial setting of ports is made at step #5. Then, whether the main switch 105 is at OFF position or at ON position is determined at step #10. When it is at OFF position, the process proceeds to step #12, where the binocular 1 is brought into a standby state. While the standby state is normally released by generation of an interrupt signal, it is released by setting the main switch 105 from OFF position to ON position in this embodiment. When the standby state is released, the process proceeds to step #15. When the main switch 105 is at ON position at step #10, a motor position initial setting subroutine is executed at step #15. In this subroutine, reference positions of the pupil distance and dioptric power are set, or the pupil distance and dioptric power are set at set positions previously-stored in the E²PROM 104.

Then, at step #20, whether the main switch 105 is at ADJ (adjustment) position or at ON position is determined. When it is at ADJ position, the process proceeds to step #25, where pupil distance adjustment, dioptric power adjustment and storing of adjustment values thereof are performed. After the ADJ mode routine is executed, the process proceeds to step #30. When the main switch 105 is at ON position at step #20, the process directly proceeds to step #30.

At step #30, whether the AF switch 106 is ON or not is determined. When it is ON, a CCD drive subroutine (step #35) and a distance measurement calculation subroutine (step #40) are successively executed. Then, at step #45, low contrast determination is made. The CCD drive is an operation to activate a CCD sensor for focus detection. The CCD drive includes an accumulating operation to accumulate a photoelectric charge for a predetermined period of time and a data dump which is performed after the accumulation. The focus detection calculation includes a calculation to detect an image shift amount between images in reference and comparison portions on the CCD sensor and a contrast calculation to detect a contrast.

The low contrast determination is a determination of whether the contrast of an object is low or not. Specifically, it is a determination of whether or not the contrast is equal to or lower than a predetermined value. When the contrast is equal to or lower than the predetermined value, focus detection is impossible. When the contrast is low at step #45, the process proceeds to step #85, where the in-focus state display mark 91 (FIG. 14) is blinked to warn that the contrast is low. Then, the process proceeds to step #115. When the contrast is not low, a defocus (DF) amount is calculated at step #50. Then, at the next step #55, a calculation result (DF+ΔDF×f(x)) of the addition of a dioptric power correction amount ΔDF×f(x) obtained in the ADJ mode routine of step #25 to the calculated defocus amount DF is set as a new defocus amount DF. Then, at step #60, a drive pulse amount MP of the motor M1 for moving the objective lenses is calculated by multiplying the defocus amount DF obtained at step #55 by coefficients K and F(x). F(x) is a coefficient which is set in consideration of the fact that the focal lengths of the objective lenses are varied during zooming.

Then, whether the drive pulse amount MP is within a predetermined range within which the image of the object can be observed under approximately in-focus condition or not is determined at step #65. When it is within the in-focus range, since it is unnecessary to move the lens, the in-focus state display mark 91 (FIG. 14) is turned on at step #85. Then, the process proceeds to step #115. When the pulse amount MP is not within the in-focus range, steps #70 and #75 are executed to move the lens to an in-focus position. At step #70, the in-focus state display mark 91 is caused to be in off state. At step #75, the motor M1 is driven. Then, the process proceeds to step #115.

When the AF switch 106 is OFF at step #30, the process proceeds to step #90, where whether the main user switch 108 is ON or not is determined. The main user switch 108 is a switch for immediately setting the pupil distance and dioptric power of the binocular 1 to those of a main user. When the switch 108 is ON, number 1 is set in the user indicating register (as subsequently-described, 1 indicates a main user) at step #95. At the next step #100, the user's pupil distance and dioptric power are set based on data from the E²PROM 104.

When the setting of step #100 is completed, the process proceeds to step #105. When the main user switch 108 is OFF at step #90, skipping steps #95 and #100, the process proceeds to step #105. At step #105, condition of the wide and tele switches 109 and 110 is determined. When either of the switches 109 and 110 is ON, a zoom drive routine is executed at step #110. Then, the process proceeds to step #115. When neither is ON, the process directly proceeds to step #115.

At step #115 to which the process proceeds from step #75, #80, #85, #105 or #110 as described above, whether the main switch 105 is at OFF position or at ON position is determined. When it is at OFF position, the process proceeds to step #12 to bring the binocular 1 into the standby state.

When it is at ON position, the process returns to step #20 to execute the flow therefrom.

Before the ADJ mode subroutine of step #25, the pupil distance and dioptric power setting subroutine of step #100 and the zoom drive subroutine of step #110 which are executed in the above-described main routine are described in detail, details of data stored in the E²PROM 104 and storage addresses thereof will be described with reference to Table 3. Each user is provided with the user number. The main user is numbered 1, while other users are numbered, 2, 3, . . . A pupil distance data, an AF compensation amount and an L dioptric power data are stored for each user. Of the data, the AF compensation amount relates to the right optical system 22. That is, since the binocular of this embodiment is designed so that focusing is performed by use of the right optical system 22 and that the dioptric power difference between the right and left optical systems 21 and 22 is thereafter eliminated by use of the left optical system 21, the AF compensation amount of the right optical system 22 is necessary in addition to the L dioptric power data.

Concerning the previously-described defocus amount DF, the objective lenses and the AF sensor module 27 are designed and arranged so that the defocus amount DF is 0 when the user with a diopter of 0 sets the binocular to an in-focus state. When the same object is viewed, the in-focus position differs depending on the dioptric power of each user. The defocus amount DF takes a value which is in accordance with the in-focus position. The AF compensation amount is the difference in defocus amount DF among the users. The AF compensation amount, the L dioptric power data and the pupil distance data are stored in the form of drive pulse counts of the motor.

The address of the E²PROM 104 and the stored data are set as shown in Table 3. Each data has a different storage address calculating expression. When x is the user number, the storage address of the pupil distance data is calculated by (x−1)×3; the storage address of the AF compensation amount, by (x−1)×3+1; and the L dioptric power data, by (x−1)×3+2. At step #95 of the previously-described main routine, number 1 is set to the user indicating resister (x resister). This means that 1 is substituted for x of the above expressions. In this case, three addresses at which data required for the main user are stored are specified, and the data stored at the addresses are read. The pupil distance data, the dioptric power data and the AF compensation amount may be stored in the IC card 103 instead of in the E²PROM 104, and may be read from the IC card 103. Moreover, the data may be stored in both of the IC card 103 and the E²PROM 104.

The ADJ mode routine shown in FIG. 24 will be described. When this routine is called, first, at step #190, the lens is set to a tele limit (a longest focal length condition). This is because the higher the magnification is, the more accurately the dioptric power adjustment is made, and because it is necessary to fix a condition at the time of the adjustment since the AF compensation amount varies depending on the lens position. The setting of the lens to the tele limit will be described later with reference to FIG. 31. At step #195, the eye marks 92 and 93 (FIG. 14) of the second display apparatus 87 are turned on. Then, at step #200, condition of the user selecting switches 107u and 107d is determined. When both of the user selecting switches 107u and 107d are OFF, condition of the main switch 105 is determined at step #202. When the main switch is at ON position, after turning off the eye marks 92 and 93 at step #310, the process proceeds to the main switch ON mode (that is, to step #30 of the main flow). When the main switch 105 is at ADJ position, the process returns to step #200.

When either of the user selecting switches 107u and 107d is ON at step #200, the user number is changed at step #205. In this case, the user number is incremented when the user selecting switch 107u is ON and decremented when the user selecting switch 107d is ON. With this, the user number displayed in the first display apparatus 16 changes.

When the change of the user number is completed at step #205, the changed user number or signal is loaded in the x register at step #210. Then, at step #215, a subsequently-described pupil distance and dioptric power setting subroutine is executed to set the pupil distance and the dioptric power to positions specified by the data stored in the E²PROM 104.

Then, at step #220, whether the setting switch 106 is ON or not is determined. When the setting switch 106 is ON, the adjusting mode is set. When it is OFF, the process returns to step #200. When the pupil distance and the dioptric power which have been set based on the data read from the E²PROM 104 coincide with the user's actual pupil distance and dioptric power, there is few possibility for the user to turn on the setting switch, since the adjustment is unnecessary. When the pupil distance or the dioptric power does not coincide, however, the setting switch will be turned on. When the setting switch is ON, after blinking the eye marks 92 and 93 in the second display apparatus 87 at step #225 to indicate that the pupil distance adjustment mode is ON, the process proceeds to step #230.

At step #230, condition of the up and down switches 109 and 110 is determined. When both of them are OFF, the process proceeds to step #240 to determine whether the dioptric power adjustment is necessary or not. When either of them is ON, after executing the pupil distance adjustment subroutine at step #235, the process returns to step #230. After the pupil distance adjustment is completed, the process proceeds to step #240.

At step #240, whether the setting switch 106 is ON or not is determined. When the setting switch 106 is OFF, condition of the main switch 105 is determined at step #241. When the main switch 105 is at ADJ position, the process returns to step #230. When the main switch 105 is at ON position, after executing a pupil distance loading subroutine (a routine for loading into the E²PROM a data representing an adjusted pupil distance) at step #242, the process proceeds to step #310. When the setting switch 106 is ON at step #240, the pupil distance loading subroutine is also executed at step #245. Then, at step #250, the right eye mark 93 is blinked in the second display apparatus to indicate that the R dioptric power adjusting mode is ON.

At step #255, condition of the up and down switches 109 and 110 is determined. When either of them is ON, after making the R dioptric power adjustment at step #260, the process returns to step #255. When both of them are OFF, after performing a distance measurement operation at step #265, the process proceeds to step #270. At step #260, the R dioptric power adjustment is made by simultaneously moving the right and left objective lenses. At this time, the user operates the up or down switch 109 or 110, with viewing a specific object (one with a high contrast is preferable) until the right-side field is brought into in-focus state for the user. In this matter, the R dioptric power adjustment is greatly different from the L dioptric power adjustment of a subsequently-described step #290 which is made by moving the eyepieces of the left optical system 21.

After the focus detection operation of step #265, a shift amount obtained through the focus detection operation is stored into the E²PROM 104 as an AF compensation amount when the setting switch 106 is ON or when the setting switch 106 is OFF and the main switch is at ON position to leave the ADJ mode (steps #275 and #272).

When the setting switch 106 is turned on to make the L dioptric power adjustment, after the AF compensation amount is stored into the E²PROM 104 at the above-mentioned step #275, the left eye mark 92 is blinked in the second display apparatus 87 to indicate that the L dioptric power adjustment mode is ON at step #280. If the user turns on either of the up and down switches 109 and 110 at this time, the L dioptric power adjustment is made at step #290. Then, the process returns to step #285. Needless to say, the user makes the L dioptric power adjustment while viewing the same object that is viewed in the R dioptric power adjustment. After the L dioptric power adjustment is completed, data on an adjusted dioptric power is stored into the E²PROM when the setting switch 106 is ON or when the setting switch 106 is OFF and the main switch is at ON position (steps #300 and #297). Then, after the L dioptric power data is stored into the E²PROM at step #300, the eye marks 92 and 93 are turned on (not blinked) in the second display apparatus 87 to indicate that both the R and L dioptric power adjustments have been completed (step #305). Then, the process returns to the first step #200 of the ADJ mode subroutine.

As described above, the pupil distance adjustment precedes the dioptric power adjustment in the ADJ mode of this embodiment. This is because to make adjustments in this order is easier than to make adjustments in the reverse order. As mentioned above, in the ADJ mode of this embodiment, the adjustment order is automatically decided to facilitate operation by the user. Further, in consideration of a case where it is difficult to find which adjustment is being made now, the kind of the adjustment being made now and the completion of the adjustment are indicated by internal displays (steps #225, #250, #280, #305, and #310).

Figure 25:
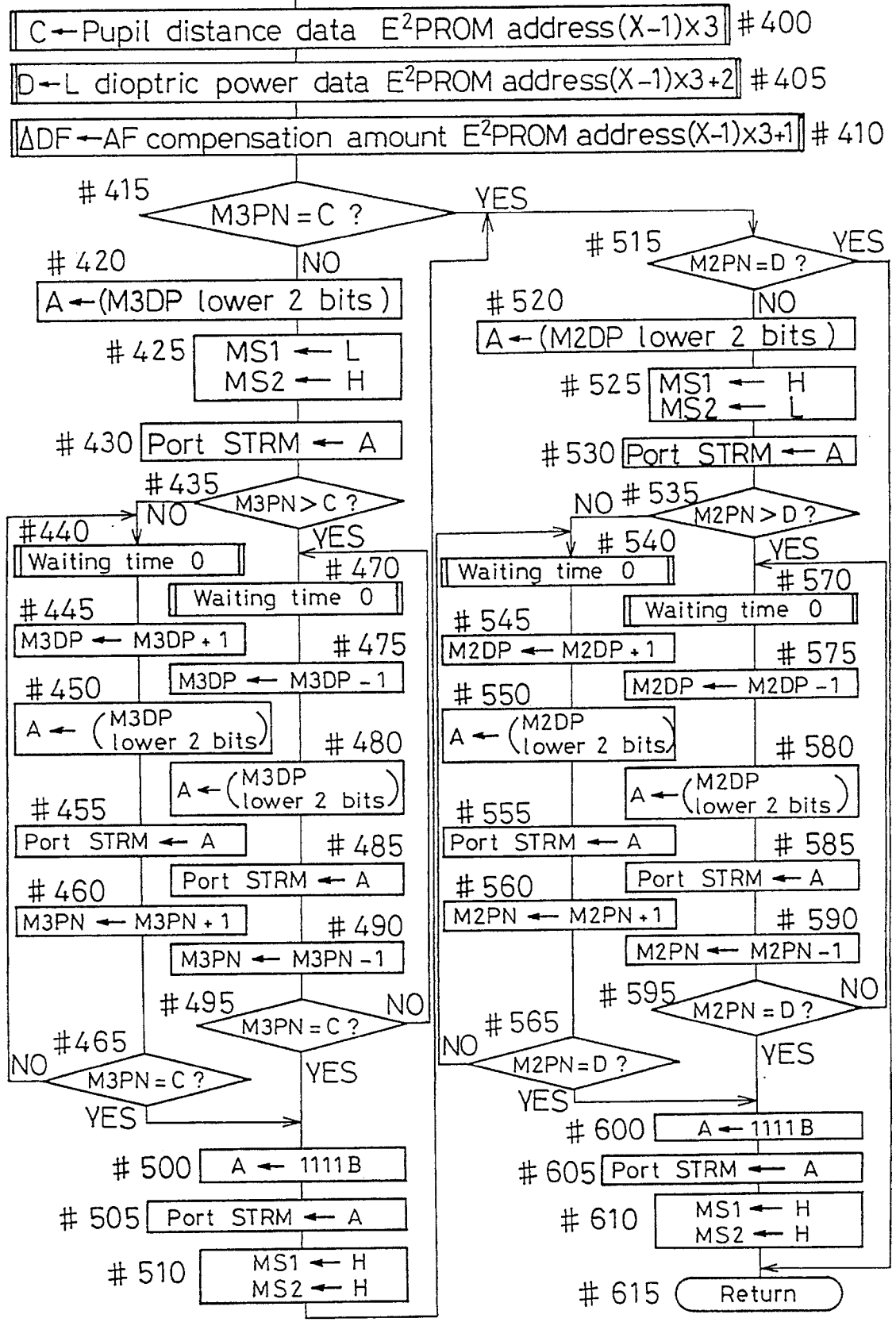
FIG. 25 is a flow chart of a pupil distance and dioptric power setting routine.

Subsequently, the pupil distance and dioptric power setting subroutine executed at step #215 of the above-described ADJ mode subroutine and at step #100 of the main routine of FIG. 23 will be described with reference to FIG. 25.

In this subroutine, a data stored in the E²PROM 104 at an address corresponding to the user number is read to set the motor drive in accordance with the data value. For example, when the user 3 is selected by the selecting switch, the motor drive is set in accordance with the data stored in an address corresponding to the user number 3.

First, at step #400, a pupil distance data is read from the E²PROM 104 and loaded into a C register. Similarly, at step #405, an L dioptric power data is read from the E²PROM 104 and loaded into a D register. Further, at step #410, an AF compensation amount is read from the E²PROM and loaded into a register ΔDF (a register for storing ΔDF).

Thereafter, the pupil distance and the dioptric power are set at steps #420 to #510 and at steps #515 to #610, respectively. At step #415, whether or not a pulse count M3PN representing a present position of the pupil distance adjusting motor M3 coincides with a content C of the C register is determined. When the pulse count M3PN coincides with the content C, since the pupil distance which is set based on the data coincides the user's pupil distance, without performing the pupil distance setting of steps #420 to #510, the process proceeds to step #515 to enter the dioptric power setting routine.

When the pulse count M3PC does not coincide with the content C, the process proceeds to step #420 to perform the pupil distance setting. At step #420, lower two bits of a data pointer M3DP having been used in a previous operation are loaded into an A register. The data pointer M3DP specifies the address of a data for driving the pupil distance adjusting motor M3. The data for driving the motor M3 has a relationship as shown in Table 4. Since the address of the data is represented by lower two bits (00H to 03H) in a RAM (random access memory) address, the lower two bits of the data pointer M3DP are used which specifies the address.

Then, the process proceeds to step #425, where the levels of the output levels MS1 and MS2 of the main CPU 100 are set to low and high, respectively. This is performed to set the motor M3 to be driven as understood from Table 1. At step #430, the content of the A register is outputted to the port STPM.

Then, at step #435, the pulse count M3PN representing a present position of the motor M3 is read from the E²PROM 104 to determine whether or not the pulse count M3PN is higher than the value C loaded in the C register. When the M3PN is equal to or lower than the value C, a process to increase the M3PN is executed (steps #440 to #460). When the M3PN is higher than the value c, a process to decrease the M3PN is executed (steps #470 to #490). In either case, after M3PN coincides with the value C (steps #465 and 495), a process to stop the motor is executed (steps #500 to #510). The motor M3 is driven by a process where the value of the A register is outputted to the output ports STPM1 to STPM4 shown in FIG. 19 (for example, steps #430 and #455) and a period of time is waited which is sufficient for driving the motor (for example, step #440).

When the pupil distance setting of steps #420 to #510 is completed, the dioptric power setting routine of steps #515 to #610 is executed. Since the dioptric power setting routine is similar to the above-described pupil distance setting routine, description thereof will be omitted. In the dioptric power setting routine, a pulse count M2PN represents a present position of the dioptric power adjusting motor M2, D represents a set value of a dioptric power loaded into the D register from the E²PROM according to the user number, and M2DP is a data pointer for specifying the storage address of a data for driving the motor M2.

Figure 24:
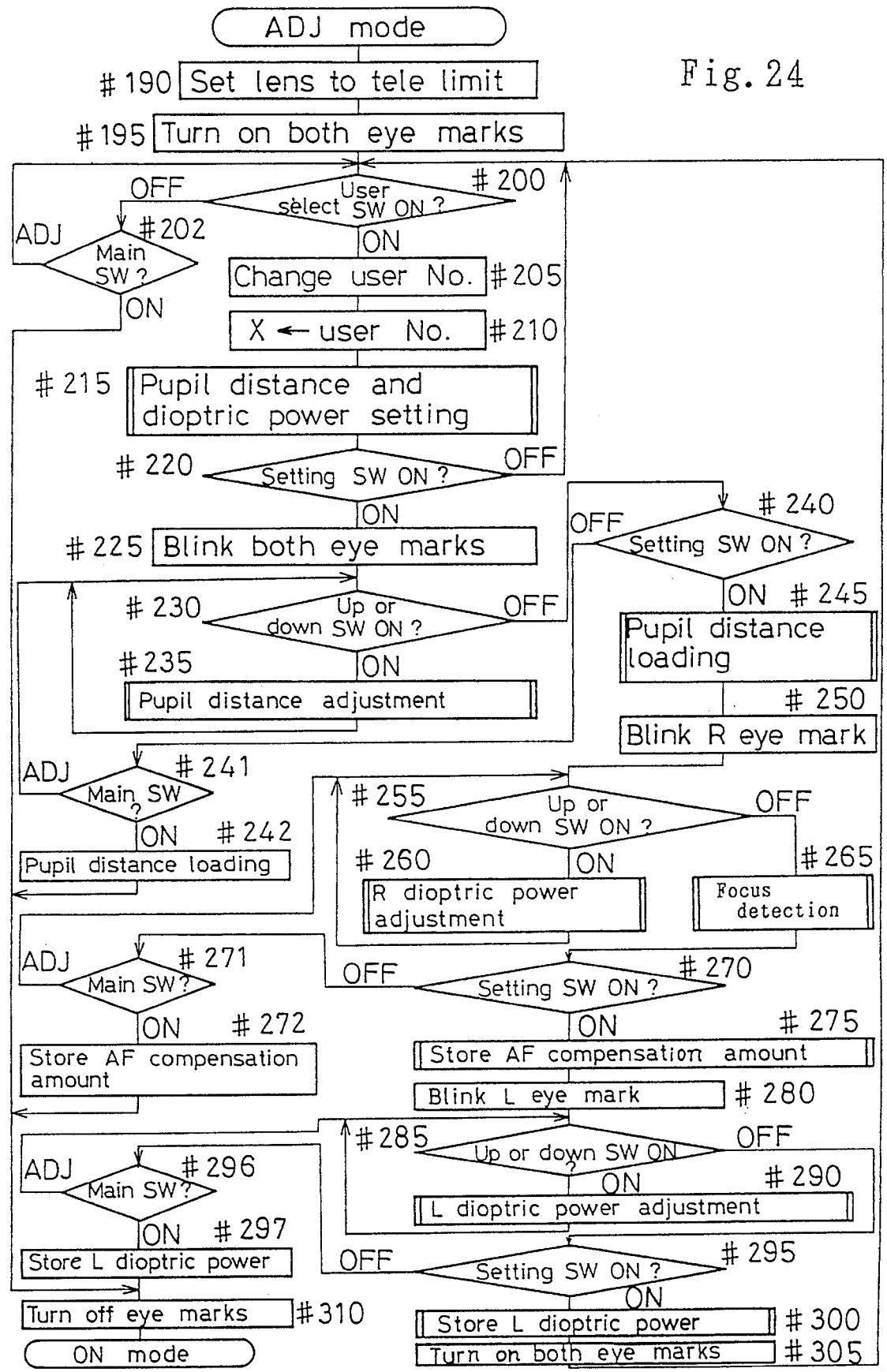
FIG. 24 is a flow chart of an ADJ mode executed in the main routine of FIG. 23.
Figure 26:
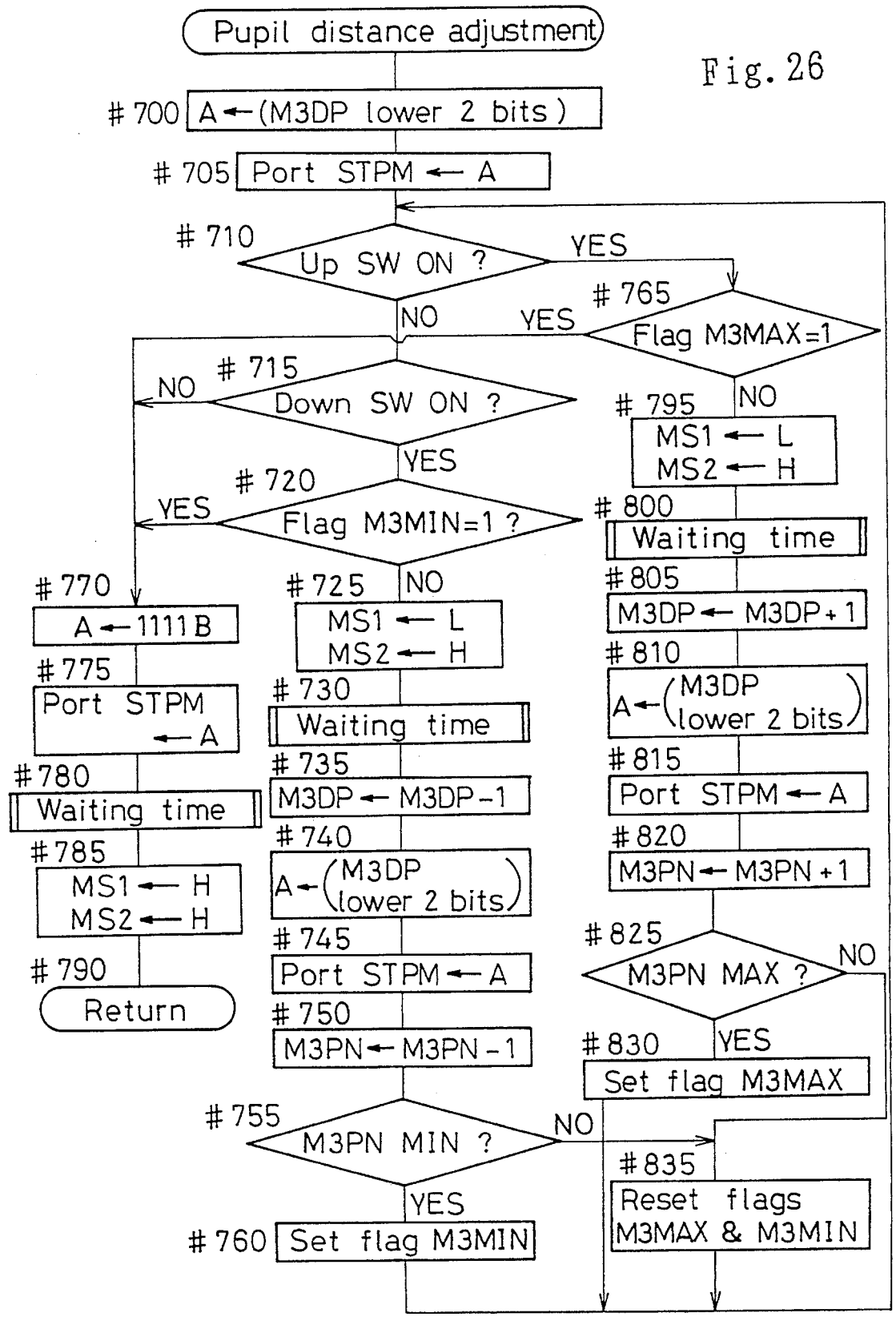
FIG. 26 is a flow chart of a pupil distance adjustment routine.
Figure 27:
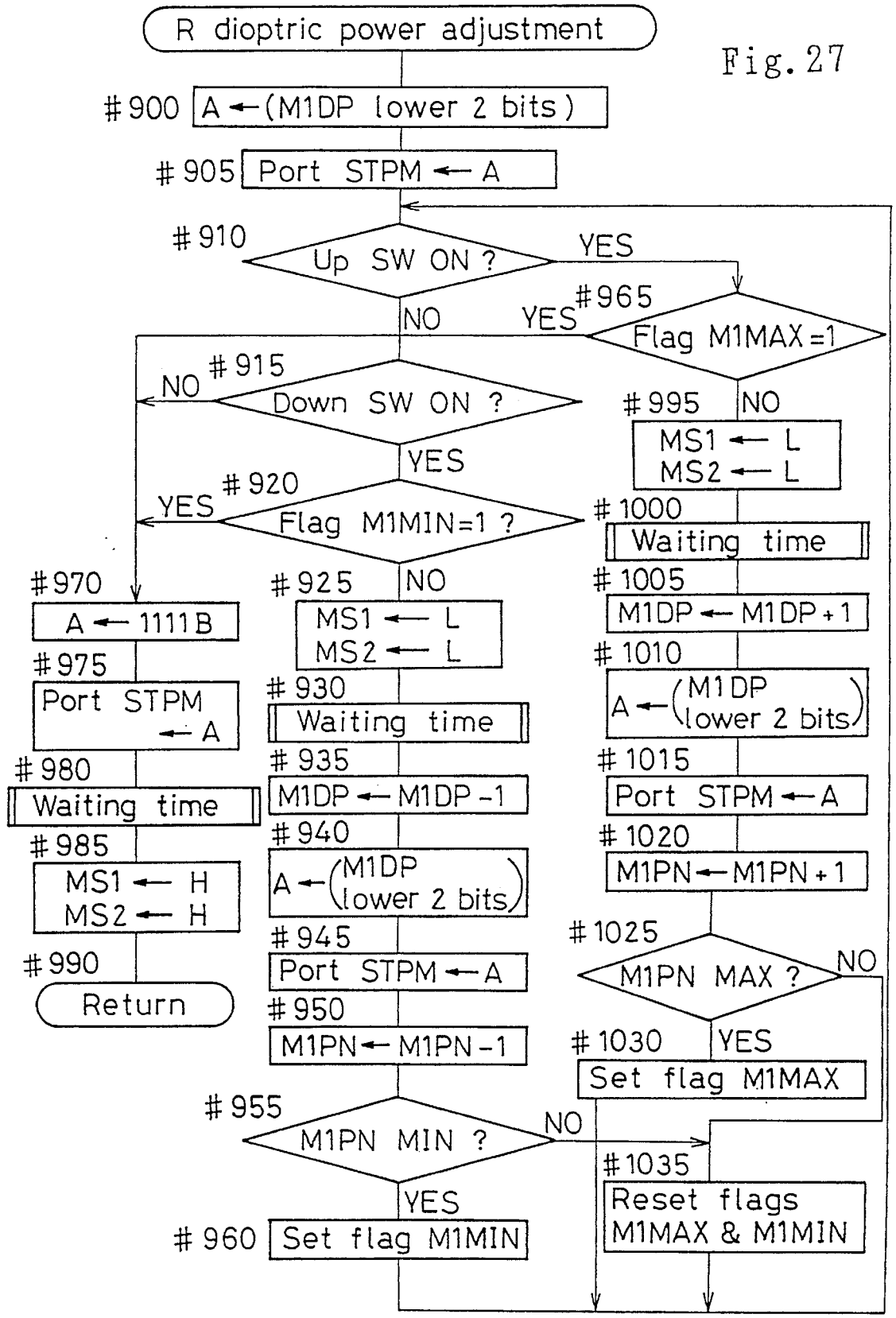
FIG. 27 is a flow chart of an R (right) dioptric power adjustment routine.
Figure 28:
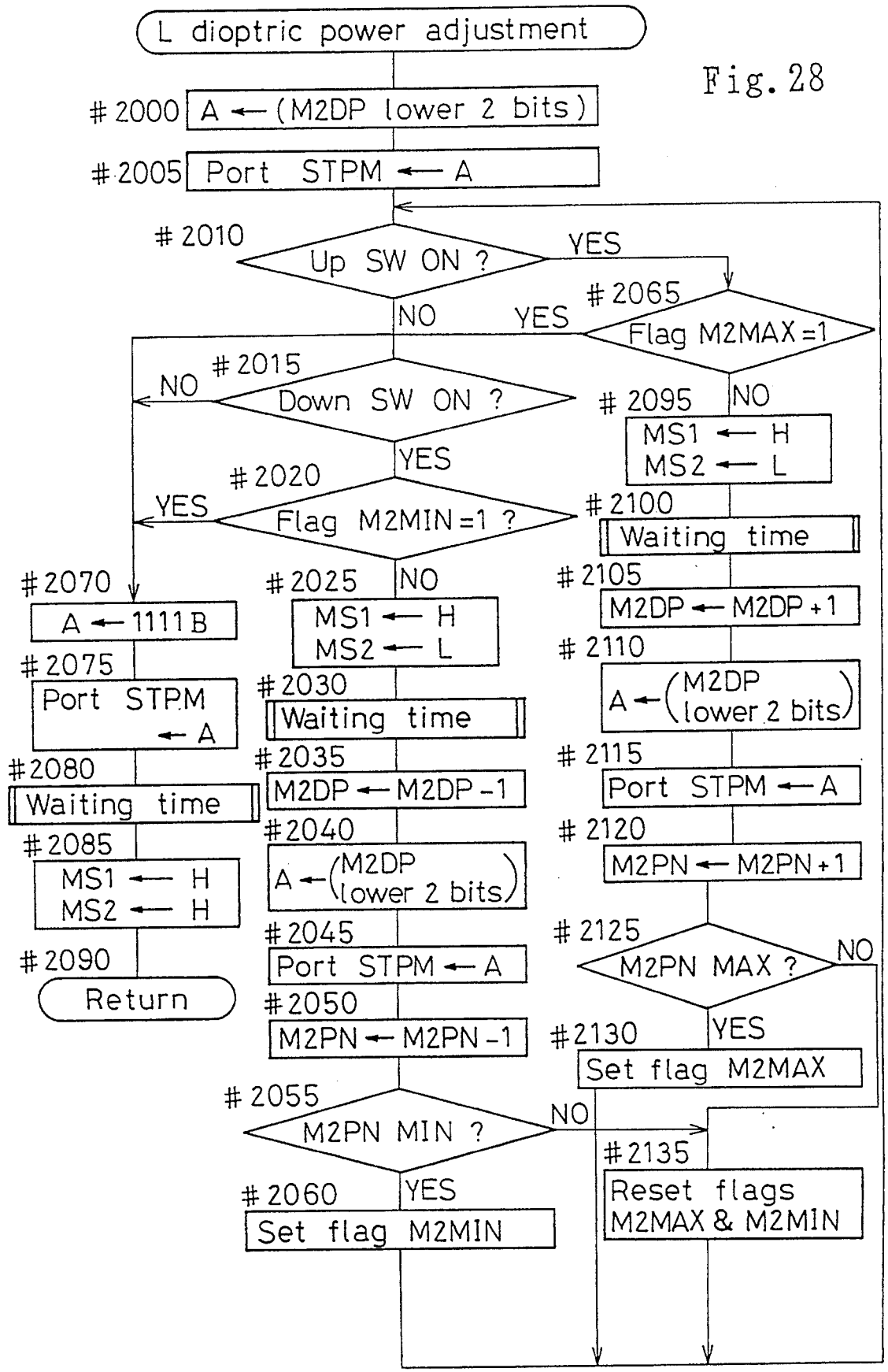
FIG. 28 is a flow chart of an L (left) dioptric power adjustment routine.

Flow charts of the pupil distance adjustment subroutine, the R dioptric power adjustment subroutine and the L dioptric power adjustment subroutine executed at steps #235, #260 and #290 of the ADJ mode subroutine of FIG. 24 are shown in FIGS. 26, 27 and 28. Since those flow charts are basically the same except that motors, and flags and data relating to the motors are different, only the flow chart of the pupil distance adjustment subroutine of FIG. 26 will be described. Concerning the flow charts of FIGS. 27 and 28, only points which require a supplementary explanation will be described. While the pupil distance and the dioptric power are automatically adjusted to values stored in the E²PROM 104 in the above-described pupil distance and dioptric power setting routine, the user adjusts the pupil distance and the dioptric power so that they coincide with his or her pupil distance and dioptric power in these adjustment routines.

In FIG. 26, at step #700, a data at an address specified by the data pointer M3DP which specifies the address of a driving data of the motor M3 is transferred to the A register. The transferred data is outputted to the ports STPM1 to STPM4 at step #705. At step #710, whether the up switch 109 is ON or not is determined. When it is ON, whether a flag M3MAX is 1 or not is determined at step #765. The up direction in which the lens barrel is moved when the up switch 109 is turned on is a direction to increase the pupil distance. The flag M3MAX is a flag which is set when the pupil distance is maximum, that is, when the pulse count M3PN is a maximum value M3PNMAX. The M3PNMAX is a constant decided by the design value of the pupil distance adjustment range. When the flag M3MAX is 1 at step #765, since the lens barrel 23 cannot be moved further in the up direction, the process proceeds to step #770 to execute a process of steps #770 to #780 to stop the motor. Then, the process returns.

When the flag M3MAX is not 1 at step #765, the motor M3 is set to be driven at step #795 to increase the pupil distance. At step #800, the process waits until the motor drive is completed. Then, at step #805, the data pointer M3DP is incremented by 1. Based on the data pointer, a data is read into the A register at step #810 and is outputted to the port STPM at step #815. At step #820, the pulse count M3PN representing a present position of the motor M3 is incremented by 1. At step #825, whether the incremented M3PN has reached the M3PNMAX or not is determined. When it has reached the M3PNMAX, since the motor cannot be driven any more, the flag M3MAX is set at step #830. Then, the process returns to step #710. When the M3PN has not reached the M3PNMAX, the process returns to step #710 by way of step #835. As a result, the motor M3 is driven again through steps #765 to #800 as long as the up switch 109 is ON. At step #835, the flag M3MAX and a flag M3MIN are reset to 0 if they are 1.

When the up switch 109 is OFF at step #710, whether the down switch 110 is ON or not is determined at step #715. When the down switch 110 is also OFF, the process of steps #770 to #785 is executed to stop the motor M3. Then, the process returns. When the down switch 110 is ON, a process of #715 to #760 is executed to move the lens barrel 23 in a direction to decrease the pupil distance. Since those steps correspond to steps #765 to #830 to increase the pupil distance, description thereof will be omitted. When the M3PN is not minimum at step #755, the process returns to step #710 by way of step #835, where the flag M3MAX is reset to 0 if it is 1. In this embodiment, the pulse count M3PN is 0 at a minimum pupil distance position M3PNMIN of the lens barrel 23 (a position at which the limit detecting switch 113 is turned on).

In the R dioptric power adjustment subroutine of FIG. 27, M1DP is a data pointer which specifies the address of a driving data of the motor M1 for moving the left and right objective lenses, and M1PN is a pulse count representing positions of the objective lenses. The pulse count M1PN is 0 at a limit position on a minus diopter side (toward the eyepieces, a position at which the limit detecting switch 111 is turned on). M1PNMAX is a maximum value of an adjustment range on a plus diopter side, and is a constant decided by a set value.

In the L dioptric power routine of FIG. 28, M2DP is a data pointer which specifies the address of a driving data of the motor M2 for driving the eyepiece of the left optical system 21, and M2PN is a pulse count representing a position of the eyepiece. The pulse count M2PN is 0 at a limit position on the minus diopter side (a position at which the detecting switch 112 is turned on). A maximum value M2PNMAX of the M2PN is also a constant similarly to M1PNMAX and M3PNMAX.

It is to b especially mentioned that the motor drive speed in the pupil distance and dioptric power adjustment is low compared to that in the pupil distance and dioptric power setting. In this embodiment, since each motor is driven until a predetermined target value (stored in the $E^2$PROM 104) is obtained in the pupil distance and dioptric power setting, the motor is rotated at a high speed so that the target value is quickly obtained. On the contrary, in the pupil distance and dioptric power adjustment, the motor drive speed is low. This is because the adjustment is difficult if the motor rotates too fast, since the pupil distance and dioptric power values change too rapidly. The time period, in the above-described flow charts, for which the process wait until the motor drive is completed differs according to the motor drive speed. "Waiting time 0" of steps #440, #470, #540 and #570 of FIG. 25 are shorter than "waiting time" of steps #730, #780, #800 of FIG. 26, steps #930, #980, and #1000 of FIG. 27, and steps #2030, #2080 and #2100 of FIG. 28.

Figure 29:
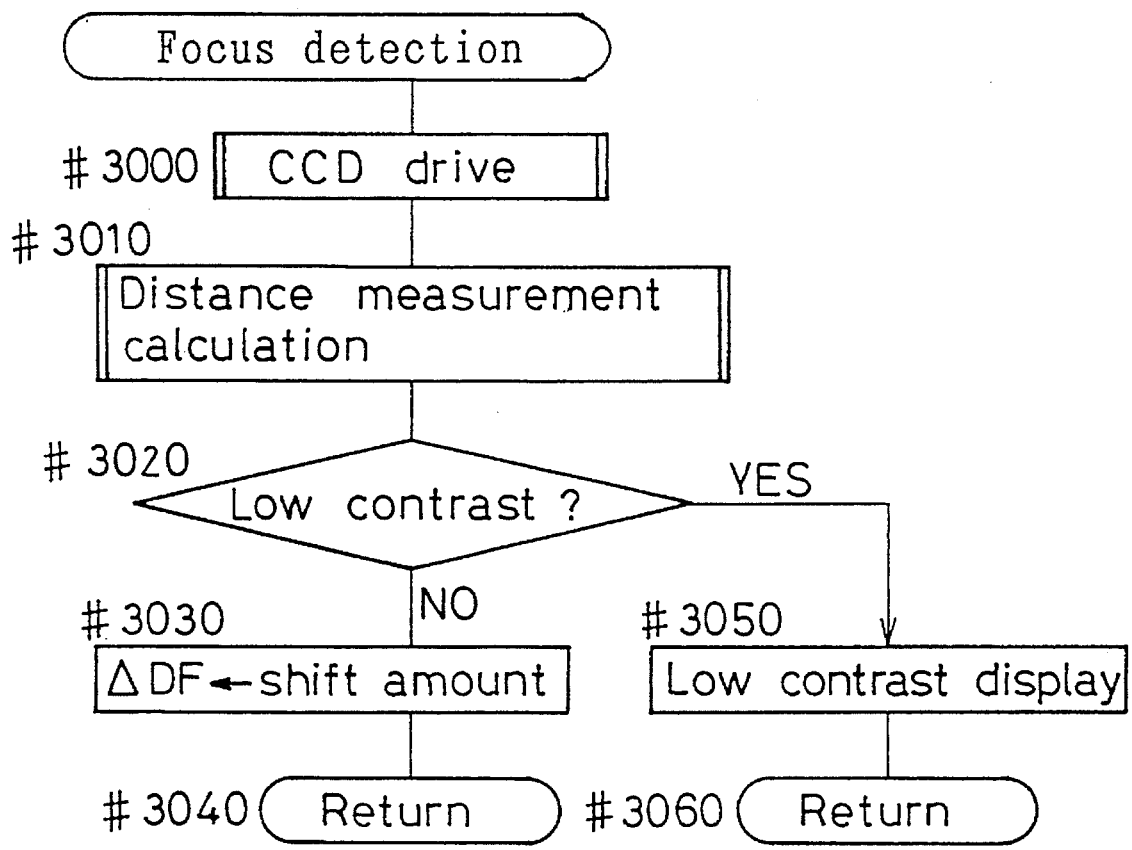
FIG. 29 is a flow chart of a focus detection routine.

FIG. 29 is a flow chart of a focus detection routine executed at step #265 of FIG. 24. First, at step #3000, the CCD drive is performed. At step #3013, focus detection calculation is performed. Then, at step #3020, whether the contrast is low or not is determined. When the contrast is low, since the focus detection value is unreliable, the process returns after blinking the in-focus state display mark 91 to indicate that the contrast is low. When the contrast is not low, a shift amount is loaded into the register ΔDF at step #3030. The shift amount is stored into the $E^2$PROM 104 as an AF compensation amount at steps #272 and #275 of FIG. 23.

Figure 30:
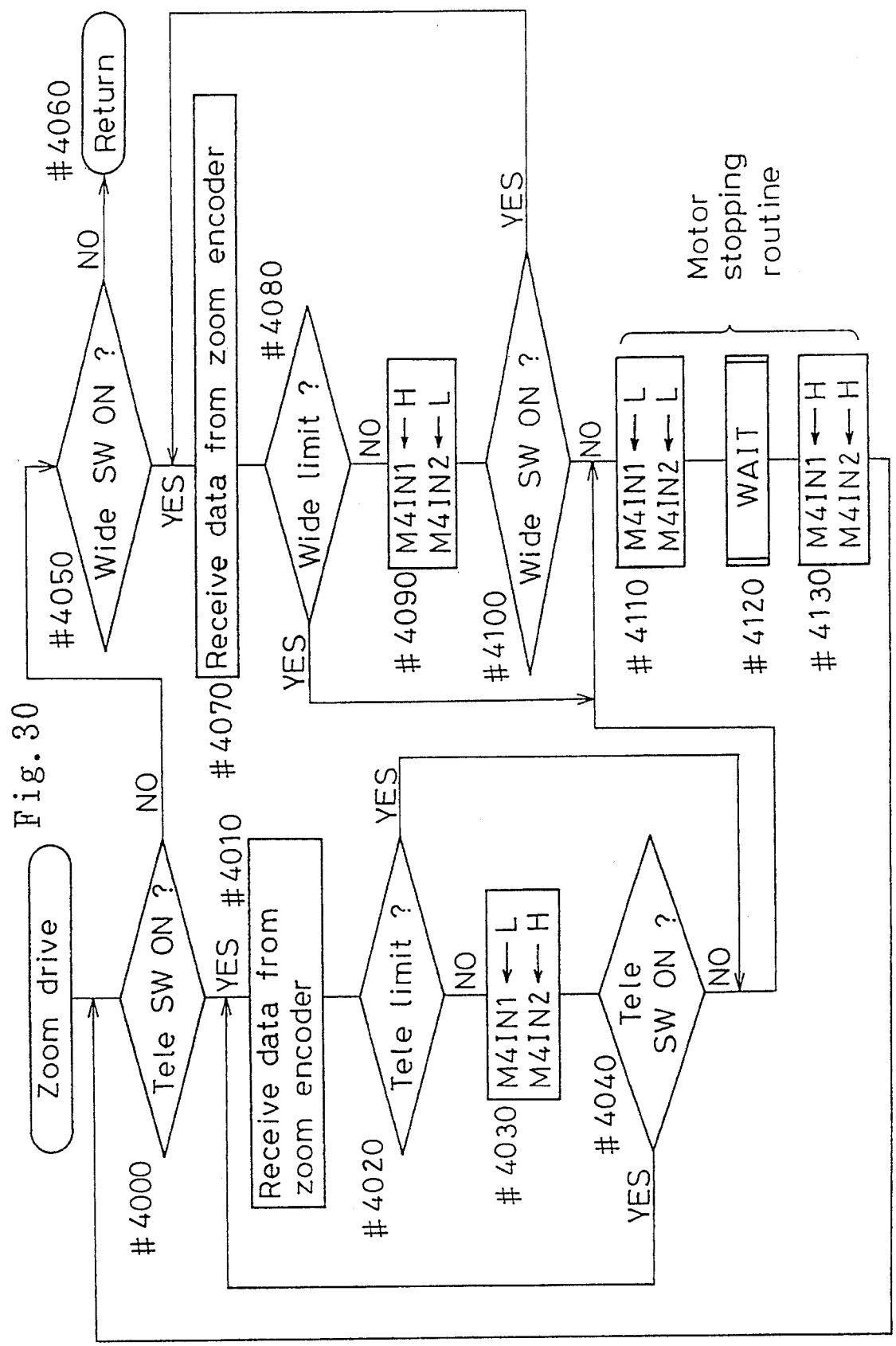
FIG. 30 is a flow chart of a zoom drive routine.

FIG. 30 is a flow chart of the zoom drive. In this embodiment, a flow chart for driving the zoom motor M4 is comparatively simple since a DC motor is used as the motor M4.

First, at step #4000, whether the tele switch 110 is ON or not is determined. When the tele switch 110 is ON, a data is received from the zoom encoder 85 at step #4010. Then, whether the zoom lens is at the tele limit or not is determined at step #4020. When the zoom lens is not at the tele limit, the levels of M4IN1 and M4IN2 are set to low and high, respectively, to drive the motor M4 in a normal direction. At the next step #4040, whether the tele switch 110 is ON or not is determined. When it is ON, the process returns to step #4010. When it is OFF, the process proceeds to a motor stopping routine of steps #4110 to #4130.

When the lens is at the tele limit at step #4020, since the lens cannot be moved any more in the tele direction, skipping steps #4030 and #4040, the process proceeds to the motor stopping routine of steps #4110 to #4130.

When the tele switch 110 is OFF at step #4000, whether the wide switch 109 is ON or not is determined at step #4050. When the wide switch 109 is also OFF, the process returns at step #4060. When the wide switch is ON, a data is received from the zoom encoder 85 at step #4070. Then, at step #4080, whether the lens is at the wide limit or not is determined. When the lens is at the wide limit, the process directly proceeds to step #4110. When the lens is not at the wide limit, the levels of M4IN1 and M4IN2 are set to high and low, respectively, to rotate the motor M4 in a reverse direction. Then, at step #4100, whether the wide switch 109 is ON or not is determined. When it is ON, the process returns to step #4070 to further move the lens in the wide direction. When the wide switch 109 is not ON, the process proceeds to the motor stopping routine of steps #4110 to #4130.

Figure 31:
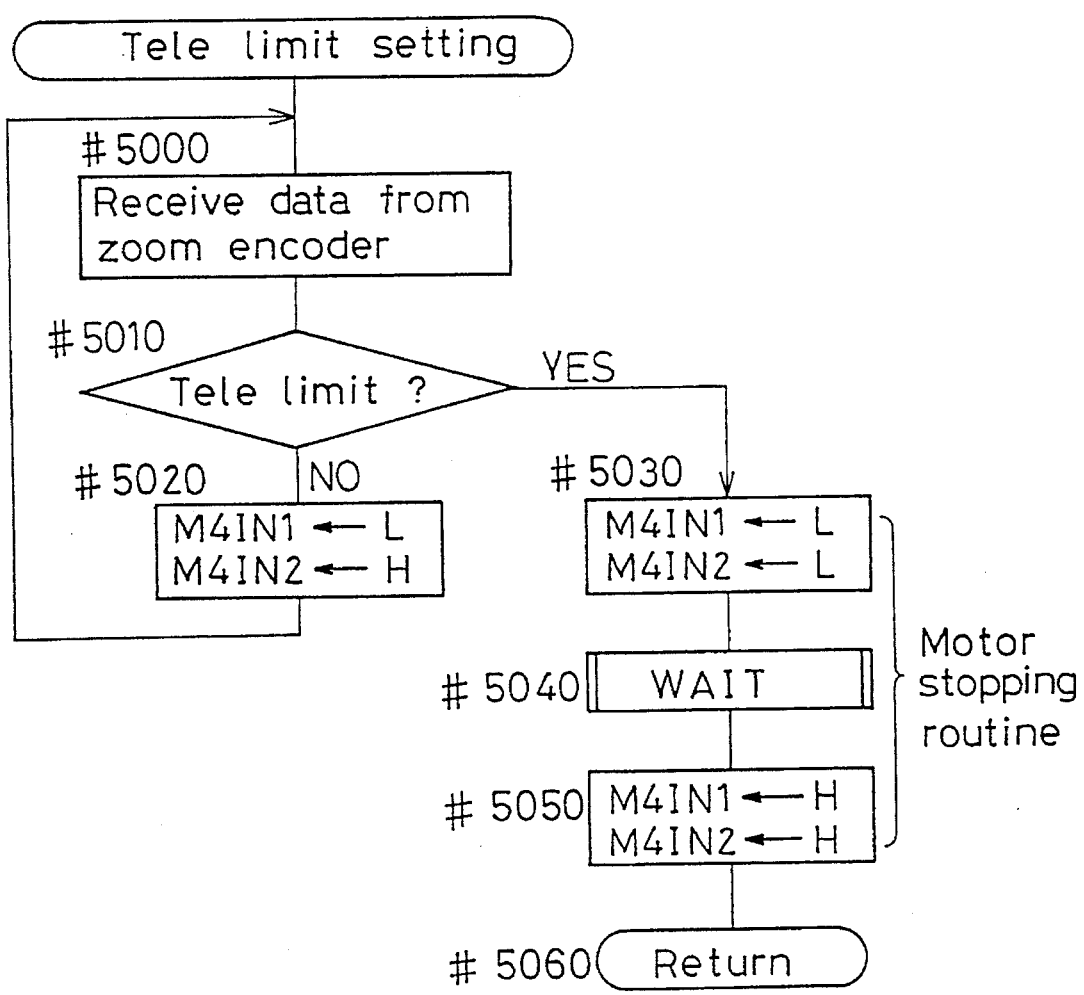
FIG. 31 is a flow chart of a tele limit setting.
Figure 33A:
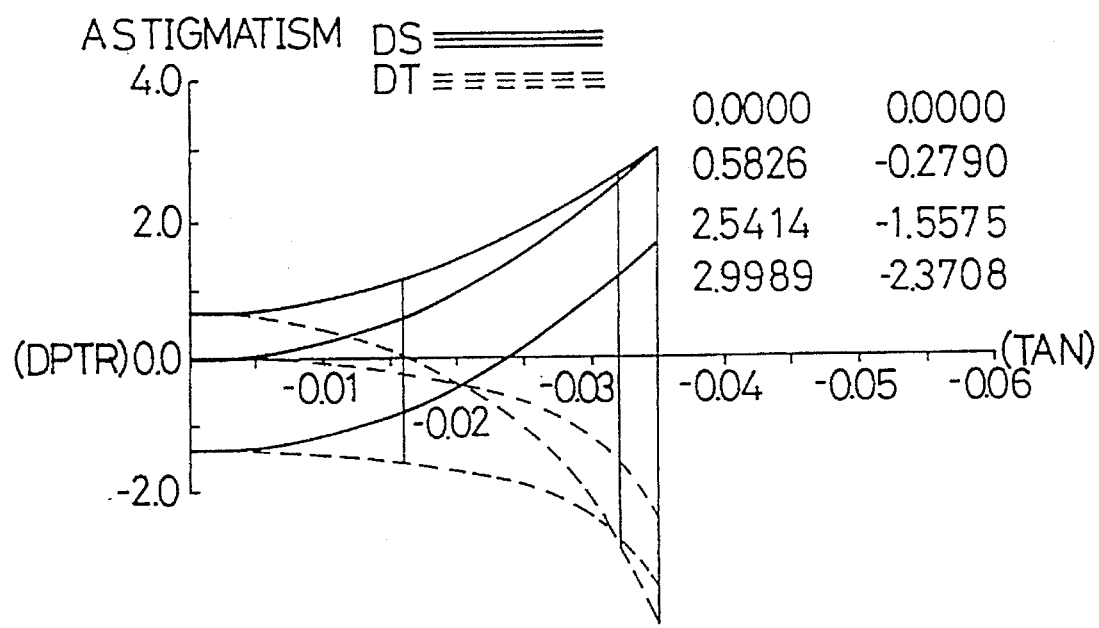
FIG. 33A, 33B and 33C are graphic representations of aberrations of the optical system of FIG. 32.
Figure 33B:
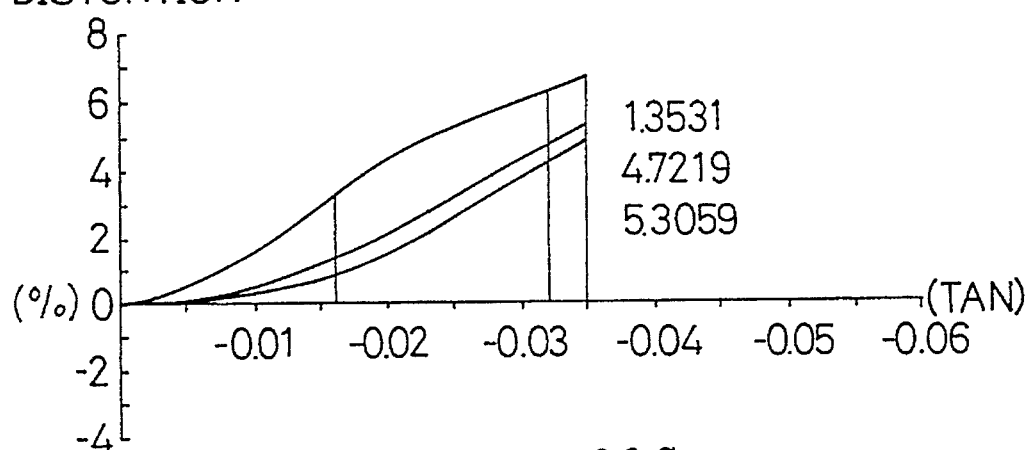
Figure 33C:
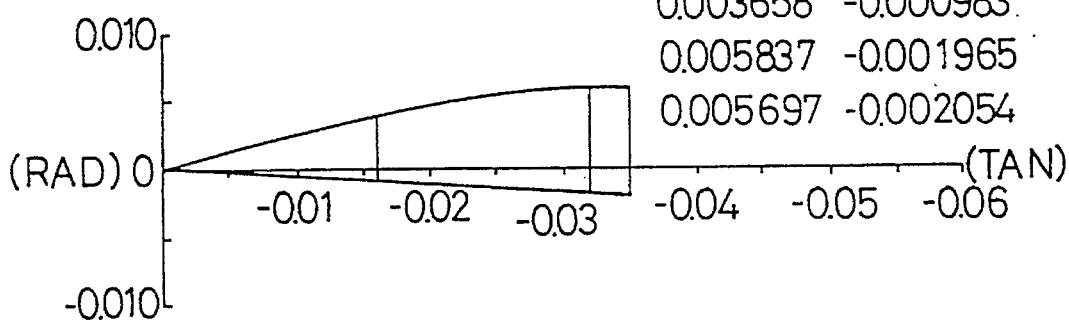
Figure 35A:
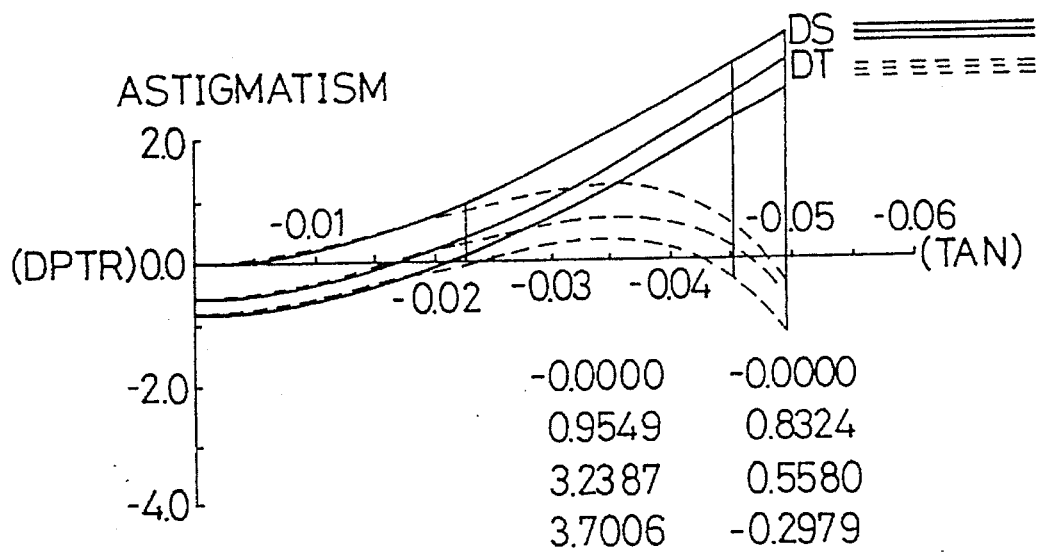
FIG. 35A, 35B and 35C are graphic representations of aberrations of the optical system of FIG. 34.
Figure 35B:
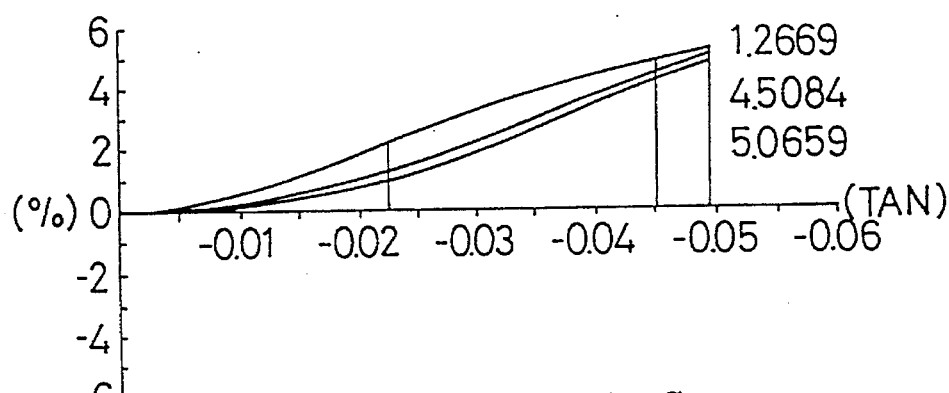
Figure 35C:
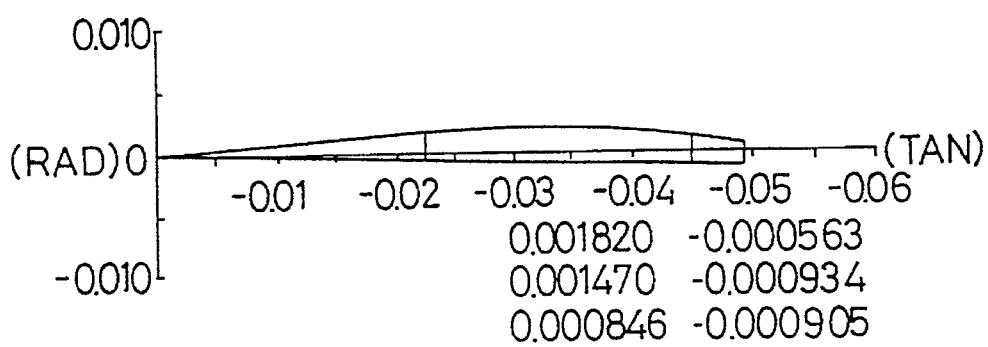

FIG. 31 is a tele limit setting subroutine executed at step #190 of FIG. 24. When the subroutine is called, first, data is received from the zoom encoder 85 shown in FIG. 12 at step #5000. At step #5010, whether the lens is at the tele limit or not is determined based on the data. When the lens is not at the tele limit, the levels of M4IN1 and M4IN2 are set to low [L] and high [H], respectively, to drive the zoom motor M4 at step #5020. Then, the process returns. When the lens is at the tele limit at step #5010, a motor stopping routine of steps #5030 to #5050 is executed. Then, the process returns.

Figure 36:
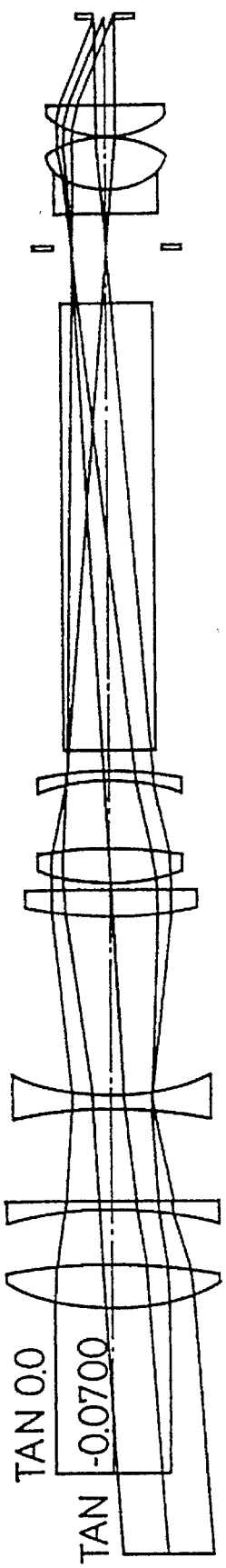
FIG. 36 shows an arrangement, at a wide limit, of the lens systems constituting the left and right optical systems.
Figure 37A:
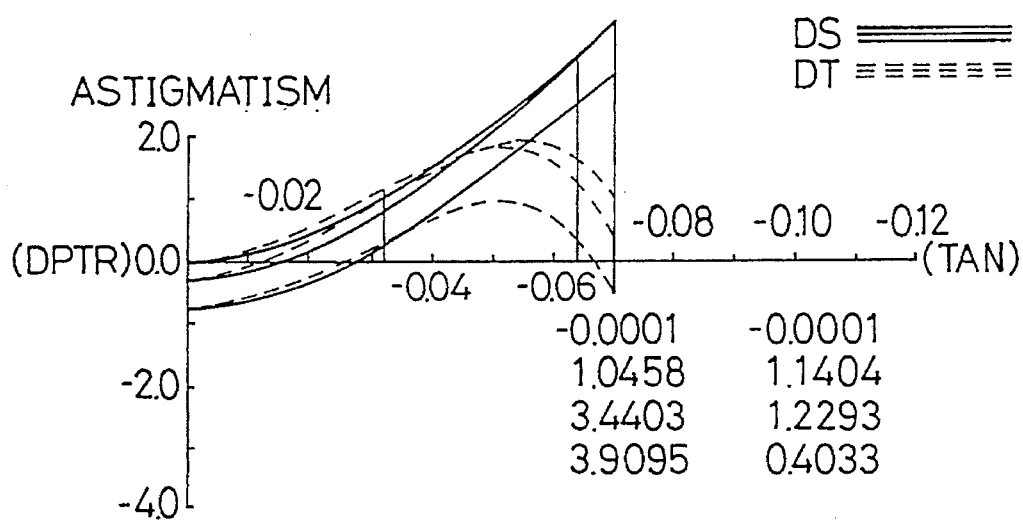
FIG. 37A, 37B and 37C are graphic representations of the optical system of FIG. 36.
Figure 37B:
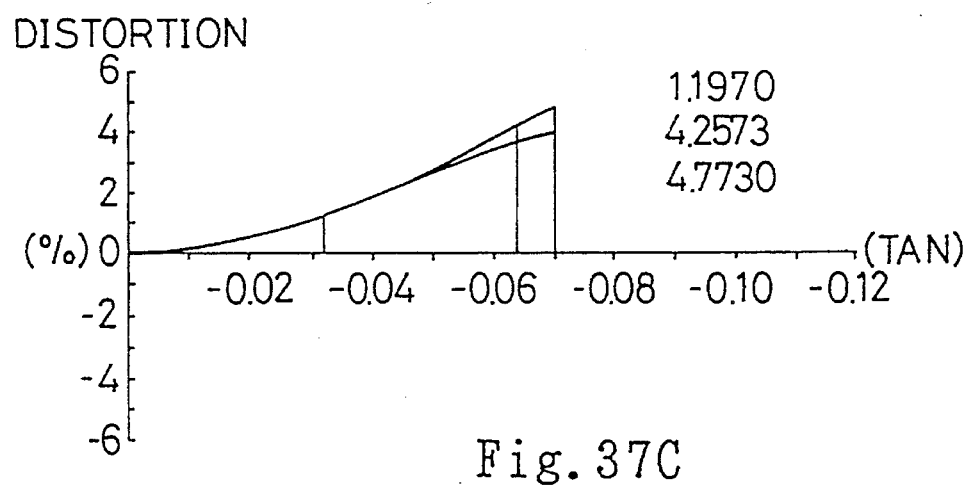
Figure 37C:
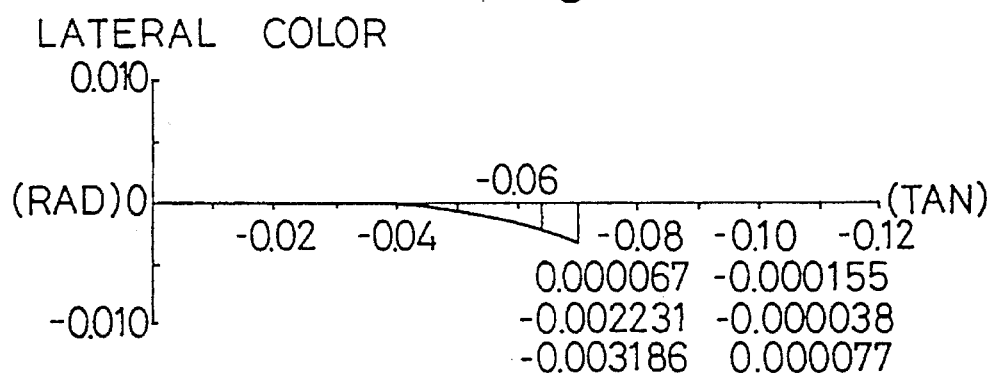

FIGS. 32, 34 and 36 show arrangements of lens systems incorporated in the left and right optical systems 21 and 22. FIG. 32 shows a lens arrangement at the tele limit. FIG. 34 shows a lens arrangement at a middle position. FIG. 36 shows a lens arrangement at the wide limit. FIGS. 33A to 33C, 35A to 35C and 37A to 37C are graphic representations of aberrations at the tele limit, at the middle position and at the wide limit, respectively.

The lens arrangements will be described referring to FIG. 32 as a representative. The AF lens system consists of a positive bi-convex lens element L1 and a negative bi-concave lens L2. The zoom lens system consists of a first unit U1 and a second unit U2. The first unit U1 consists of only a negative bi-concave lens element L3. The second unit U2 consists of two positive bi-convex lens elements L4 and L5.

L6 is a fixed negative lens concave to the object side and convex to the image side. Numeral 25 is a prism (roof prism) shown in a developed form. The eyepiece consists of three lens elements L7, L8 and L9. Of them, L7 and L8 constitute a doublet lens.

Data on the lens arrangement at wide limit (FIG. 36) are shown in Table 7. In the table, ri (i=1 to 21) represents an ith surface counted from the object side, CR shows a radius of curvature of each surface, T shows axial distances, and GH shows refractive indices.

TABLE 1

| MS1 | MS2 | A | B | C | |
|-----|-----|---|---|---|---|
| L | L | H | L | L | Select M1 |
| H | L | L | H | L | Select M2 |
| L | H | L | L | H | Select M3 |
| H | H | L | L | L | Inhibit all |

TABLE 2

| M4IN1 | M4IN2 | M4OUT1 | M4OUT2 | Motor |
|-------|-------|--------|--------|-------|
| L | H | H | L | Normal rotation |
| H | L | L | H | Reverse rotation |
| L | L | L | L | Brake |
| H | H | OFF | OFF | Wait |

TABLE 3

| $E^2$PROM address | | Stored data | |
|---|---|---|---|
| User No. 1 (Main user) | 00H | M3PN1 | Pupil distance data |
| | 01H | ΔDF1 | AF compensation data |
| | 02H | M2PN1 | L dioptric power data |
| User No. 2 | 03H | M3PN2 | |
| | 04H | ΔDF2 | |
| | 05H | M2PN2 | |
| User No. 3 | 06H | M3PN3 | |
| | 07H | ΔDF3 | |
| | 08H | M2PN3 | |

Storage address of pupil distance data = (x − 1) × 3
Storage address of AF compensation amount = (x − 1) × 3 + 1
Storage address of L dioptric power data = (x − 1) × 3 + 2 x: a user number

TABLE 4

Pupil Distance Adjustment

| RAM address | Data |
|---|---|
| 00H | 0011 |
| 01H | 0110 |
| 02H | 1100 |
| 03H | 1001 |
| | 4321STPM |

TABLE 5

R Dioptric Power Adjustment

| RAM address | Data |
|---|---|
| 00H | 0011 |
| 01H | 0110 |
| 02H | 1100 |
| 03H | 1001 |

TABLE 6

L Dioptric Power Adjustment

| RAM address | Data |
|---|---|
| 00H | 0011 |
| 01H | 0110 |
| 02H | 1100 |
| 03H | 1001 |

TABLE 7

CONSTRUCTION

| | CR | T | GH |
|---|---|---|---|
| | | 0.000 | 1.00000 |
| r1 | 35.977 | | |
| | | 6.000 | 1.51680 |
| r2 | −112.194 | | |
| | | 8.000 | 1.00000 |
| r3 | −63.885 | | |
| | | 1.200 | 1.76500 |
| r4 | 2817.933 | | |
| | | 12.946 | 1.00000 |
| r5 | −76.387 | | |
| | | 2.000 | 1.80100 |
| r6 | 36.393 | | |
| | | 25.594 | 1.00000 |
| r7 | 63.970 | | |
| | | 4.000 | 1.75450 |
| r8 | −715.629 | | |
| | | 1.000 | 1.00000 |
| r9 | 36.877 | | |
| | | 5.000 | 1.51680 |
| r10 | −53.466 | | |
| | | 10.027 | 1.00000 |
| r11 | −27.288 | | |
| | | 1.200 | 1.83350 |
| r12 | −48.804 | | |
| | | 3.036 | 1.00000 |
| r13 | 0.000 | | |
| | | 63.775 | 1.51680 |
| r14 | 0.000 | | |
| | | 8.033 | 1.00000 |
| r15 | 0.000 | | |
| | | 4.932 | 1.00000 |

TABLE 7-continued

| | CONSTRUCTION | | |
|---|---|---|---|
| | CR | T | GH |
| r16 | 1092.643 | | |
| | | 3.500 | 1.83350 |
| r17 | 11.254 | | |
| | | 7.500 | 1.62041 |
| r18 | −16.157 | | |
| | | 0.200 | 1.00000 |
| r19 | 13.984 | | |
| | | 4.500 | 1.69680 |
| r20 | −153.772 | | |
| | | 12.000 | 1.00000 |
| r21 | 0.000 | | |
| | | | 1.00000 |
| | SUM-T | 184.443 | |

Obviously, many modifications and variations of the present invention are possible in light of the above teachings. It is therefore to be understood that within the scope of the appended claims, the invention may be practiced other than as specifically described.

What is claimed is:

1. A binocular system comprising:

a binocular housing member;

an optical system mounted in the binocular housing member;

a memory for electrically storing data corresponding to a plurality of users' dioptric powers;

a data entering member, on the binocular housing, for entering data of a user's dioptric power for storage in the memory, whereby a new user can have a dioptric power stored or a stored dioptric power can be altered;

means on the binocular housing member for identifying a specific user to enable an addressing of the memory; and a dioptric power adjustor which automatically adjusts a dioptric power of the optical system according to data stored in the memory for an identified specific user.

2. A binocular system according to claim 1 wherein the memory is removably mounted in the binocular housing member, the binocular housing member having an aperture for operatively inserting the memory.

3. A binocular system according to claim 1 further including a setter which automatically sets the optical system at the longest focal length when the data entering member is enabled.

4. A binocular system according to claim 1 further including a liquid crystal display, for indicating a specific user, is mounted on the binocular housing member.

5. A binocular system to permit an operator user to automatically set a dioptric power comprising:

an optical system;

means for moving the optical system to provide a dioptric power adjustment suitable for the dioptric power requirement of a user;

means for entering a specific user signal for a particular dioptric power adjustment;

storing means for storing data of a specific user signal and the corresponding specific dioptric power adjustment;

switch means for addressing a stored specific user signal in the storing means; and means, in response to the switch means, for enabling the moving means to provide a dioptric power adjustment for the optical system corresponding to the stored specific user signal entered by the switch means.

6. A binocular system according to claim 5, further comprising a second switch means for changing a dioptric power irrespective of the stored relationship of a user signal and the stored user dioptric power.

7. A binocular system according to claim 5, wherein said user signal is incremented or decremented every time the means for entering is operated.

8. A binocular system according to claim 5, further comprising a display portion which displays the user signal.

* * * * *